US011921529B2

(12) United States Patent
Shih et al.

(10) Patent No.: US 11,921,529 B2
(45) Date of Patent: *Mar. 5, 2024

(54) DUAL LOOP DIGITAL LOW DROP REGULATOR AND CURRENT SHARING CONTROL APPARATUS FOR DISTRIBUTABLE VOLTAGE REGULATORS

(71) Applicant: Intel Corporation, Santa Clara, CA (US)

(72) Inventors: Yi-Chun Shih, Hillsboro, OR (US); Kaushik Mazumdar, Charlottesville, VA (US); Stephen T. Kim, Hillsboro, OR (US); Rinkle Jain, Portland, OR (US); James W. Tschanz, Portland, OR (US); Muhammad M. Khellah, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 661 days.

This patent is subject to a terminal disclaimer.

(21) Appl. No.: 16/914,174

(22) Filed: Jun. 26, 2020

(65) Prior Publication Data

US 2020/0393861 A1 Dec. 17, 2020

Related U.S. Application Data

(63) Continuation of application No. 13/801,777, filed on Mar. 13, 2013, now Pat. No. 10,698,432.

(51) Int. Cl.
*G05F 1/46* (2006.01)
*G05F 1/56* (2006.01)
(Continued)

(52) U.S. Cl.
CPC ............... *G05F 1/563* (2013.01); *G05F 1/46* (2013.01); *G05F 1/00* (2013.01); *H02M 3/156* (2013.01)

(58) Field of Classification Search
None
See application file for complete search history.

(56) References Cited

U.S. PATENT DOCUMENTS 4,187,527 A 2/1980 Bentley
4,242,730 A 12/1980 Golias
(Continued)

OTHER PUBLICATIONS

Trivedi et al., "A Modified Droop Control Method for Parallel Operation of VSI's in Microgrid" 2013, IEEE ISGT Asia 2013 1569814017. (Year: 2013).*
(Continued)

*Primary Examiner* — Mohammad Ali
*Assistant Examiner* — Kelvin Booker
(74) *Attorney, Agent, or Firm* — Schwabe, Williamson & Wyatt, P.C.

(57) ABSTRACT

Described is an apparatus which comprises: a plurality of transistors coupled to an input power supply and to a load; a first comparator with a first node coupled to the load, and a second node coupled to a first reference; a second comparator with a first node coupled to the load, and a second node coupled to a second reference, the second reference being different from the first reference; and a logic unit to receive output of the first comparator and output of the second comparator, the logic unit to turn on or off transistors of the plurality of transistors according to outputs of the first and second comparators.

20 Claims, 16 Drawing Sheets

(51) Int. Cl.
*G05F 1/563* (2006.01)
*H02M 3/15* (2006.01)
*G05F 1/00* (2006.01)
*H02M 3/156* (2006.01)

(56) References Cited

U.S. PATENT DOCUMENTS

| | | | |
|---|---|---|---|
| 4,255,792 A | 3/1981 | Das | |
| 4,595,820 A | 6/1986 | Richardson | |
| 4,605,863 A | 8/1986 | Toudo | |
| 4,678,947 A | 7/1987 | Huijsing et al. | |
| 4,779,037 A | 10/1988 | Locascio | |
| 4,786,877 A | 11/1988 | Leydier | |
| 5,228,072 A | 7/1993 | Ingalsbe et al. | |
| 5,262,999 A | 11/1993 | Etoh | |
| 5,297,086 A | 3/1994 | Nasu | |
| 5,297,097 A | 3/1994 | Etoh | |
| 5,309,446 A | 5/1994 | Cline | |
| 5,345,422 A | 9/1994 | Redwine | |
| 5,512,814 A | 4/1996 | Allman | |
| 5,963,439 A * | 10/1999 | Wuidart | H02J 1/10 361/111 |
| 6,100,678 A | 8/2000 | Hobrecht | |
| 6,160,417 A | 12/2000 | Taguchi | |
| 6,198,262 B1 | 3/2001 | Squibb et al. | |
| 6,208,497 B1 | 3/2001 | Seale et al. | |
| 6,246,221 B1 * | 6/2001 | Xi | G05F 1/575 323/280 |
| 6,373,789 B2 | 4/2002 | Koike | |
| 6,462,929 B2 | 10/2002 | Compton | |
| 6,518,737 B1 | 2/2003 | Stanescu et al. | |
| 6,650,093 B1 | 11/2003 | Baldwin et al. | |
| 6,820,602 B1 | 11/2004 | Masters et al. | |
| 7,176,664 B1 | 2/2007 | Potanin et al. | |
| 7,199,565 B1 | 4/2007 | Demolli | |
| 7,405,546 B2 * | 7/2008 | Amrani | G05F 1/565 323/280 |
| 7,408,331 B2 | 8/2008 | Tanaka | |
| 7,446,515 B2 * | 11/2008 | Wang | G05F 1/575 323/280 |
| 7,531,996 B2 | 5/2009 | Yang et al. | |
| 7,570,035 B2 | 8/2009 | Kleveland | |
| 7,595,569 B2 | 9/2009 | Amerom et al. | |
| 7,598,716 B2 | 10/2009 | Schlueter et al. | |
| 7,635,969 B2 | 12/2009 | Hoshino et al. | |
| 7,728,569 B1 | 6/2010 | Le et al. | |
| 7,847,530 B2 | 12/2010 | Takagi | |
| 7,872,454 B2 | 1/2011 | Sutardja | |
| 7,978,012 B2 | 7/2011 | Wood | |
| 8,022,681 B2 | 9/2011 | Gurcan | |
| 8,035,362 B2 | 10/2011 | Blanken | |
| 8,258,765 B2 | 9/2012 | Nishida | |
| 8,258,766 B1 | 9/2012 | Sutardja | |
| 8,289,009 B1 | 10/2012 | Strik et al. | |
| 8,330,532 B2 | 12/2012 | Nikolov et al. | |
| 8,344,714 B2 * | 1/2013 | Huang | G05F 1/565 307/130 |
| 8,487,593 B2 | 7/2013 | Laur et al. | |
| 8,536,844 B1 | 9/2013 | Kumar et al. | |
| 8,610,417 B1 * | 12/2013 | Sutardja | G05F 1/563 323/284 |
| 8,680,821 B2 * | 3/2014 | Vogman | H02M 3/156 323/222 |
| 8,917,069 B2 | 12/2014 | Howes et al. | |
| 8,975,882 B2 | 3/2015 | Li | |
| 2001/0043450 A1 | 11/2001 | Seale et al. | |
| 2003/0043936 A1 | 3/2003 | Forbes | |
| 2003/0102851 A1 * | 6/2003 | Stanescu | G05F 1/575 323/280 |
| 2003/0128071 A1 | 7/2003 | Nguyen | |
| 2004/0070276 A1 | 4/2004 | Liu et al. | |
| 2005/0068015 A1 * | 3/2005 | Hazucha | G05F 1/46 323/272 |
| 2005/0242791 A1 * | 11/2005 | Rajapandian | G05F 1/46 323/268 |
| 2006/0000460 A1 | 1/2006 | Masters et al. | |
| 2006/0017423 A1 | 1/2006 | Frith et al. | |
| 2006/0022640 A1 | 2/2006 | Frith et al. | |
| 2006/0114019 A1 | 6/2006 | Sutardja | |
| 2006/0120122 A1 * | 6/2006 | Lipcsei | H02M 3/156 363/98 |
| 2006/0170404 A1 * | 8/2006 | Amrani | G05F 1/565 323/282 |
| 2006/0208714 A1 * | 9/2006 | Saeki | H02M 3/1588 323/282 |
| 2006/0261794 A1 | 11/2006 | May | |
| 2007/0204137 A1 | 8/2007 | Tran | |
| 2008/0055014 A1 | 3/2008 | Tsfaty | |
| 2008/0164765 A1 * | 7/2008 | Illegems | G05F 1/56 307/80 |
| 2008/0169795 A1 * | 7/2008 | Wang | G05F 1/575 323/280 |
| 2008/0174289 A1 | 7/2008 | Gurcan et al. | |
| 2008/0284395 A1 * | 11/2008 | Wang | G05F 1/56 323/282 |
| 2009/0021219 A1 | 1/2009 | Yoda et al. | |
| 2009/0096531 A1 | 4/2009 | Shimamoto et al. | |
| 2009/0153108 A1 | 6/2009 | Hendin et al. | |
| 2009/0224741 A1 | 9/2009 | Marholev et al. | |
| 2009/0278517 A1 | 11/2009 | Kleveland | |
| 2009/0322725 A1 | 12/2009 | David et al. | |
| 2010/0060078 A1 * | 3/2010 | Shaw | H02M 1/36 307/31 |
| 2010/0079439 A1 | 4/2010 | Bar et al. | |
| 2010/0141223 A1 | 6/2010 | Wadhwa | |
| 2010/0173180 A1 | 7/2010 | Li | |
| 2010/0259235 A1 | 10/2010 | Ozalevli et al. | |
| 2010/0328199 A1 | 12/2010 | Piasecki et al. | |
| 2010/0328286 A1 | 12/2010 | Piasecki et al. | |
| 2010/0328295 A1 | 12/2010 | Piasecki et al. | |
| 2011/0095614 A1 | 4/2011 | Audy | |
| 2011/0127984 A1 * | 6/2011 | Huang | G05F 1/565 323/284 |
| 2011/0156774 A1 | 6/2011 | Ge | |
| 2011/0181259 A1 | 7/2011 | Shen | |
| 2011/0222322 A1 | 9/2011 | Kris et al. | |
| 2011/0291637 A1 | 12/2011 | Vijayaraghavan et al. | |
| 2011/0298280 A1 | 12/2011 | Homol et al. | |
| 2012/0020130 A1 | 1/2012 | Dougherty et al. | |
| 2012/0062279 A1 | 3/2012 | Kuhn et al. | |
| 2012/0161733 A1 | 6/2012 | Hua et al. | |
| 2012/0187927 A1 | 7/2012 | Yu et al. | |
| 2012/0223685 A1 * | 9/2012 | Tsai | G05F 1/563 323/270 |
| 2012/0249093 A1 * | 10/2012 | Grbo | H02M 3/1588 323/234 |
| 2012/0312880 A1 | 12/2012 | Ochoa et al. | |
| 2012/0312881 A1 | 12/2012 | Ochoa et al. | |
| 2012/0313592 A1 | 12/2012 | Ochoa et al. | |
| 2012/0313603 A1 | 12/2012 | Ochoa | |
| 2012/0313665 A1 | 12/2012 | Ochoa | |
| 2012/0313698 A1 | 12/2012 | Ochoa et al. | |
| 2013/0002224 A1 | 1/2013 | Lin | |
| 2013/0049832 A1 | 2/2013 | Wong | |
| 2013/0051290 A1 | 2/2013 | Endo et al. | |
| 2013/0069608 A1 | 3/2013 | Gakhar et al. | |
| 2013/0113447 A1 | 5/2013 | Kadanka | |
| 2013/0141062 A1 | 6/2013 | Khlat | |
| 2013/0141063 A1 | 6/2013 | Kay et al. | |
| 2013/0141064 A1 | 6/2013 | Kay et al. | |
| 2013/0141068 A1 | 6/2013 | Kay et al. | |
| 2013/0141151 A1 | 6/2013 | Ochoa et al. | |
| 2013/0154592 A1 | 6/2013 | Teh | |
| 2013/0162233 A1 | 6/2013 | Marty | |
| 2013/0169246 A1 | 7/2013 | Shao | |
| 2013/0271100 A1 | 10/2013 | El-Nozahi | |
| 2013/0307631 A1 | 11/2013 | Lotfy et al. | |
| 2014/0002041 A1 | 1/2014 | Soenen et al. | |
| 2014/0043875 A1 | 2/2014 | Hsing et al. | |
| 2014/0055112 A1 | 2/2014 | Pigott | |

(56) References Cited

U.S. PATENT DOCUMENTS

| | | | |
|---|---|---|---|
| 2014/0084881 A1* | 3/2014 | Shih | G05F 1/56 323/269 |
| 2014/0097791 A1 | 4/2014 | Lisuwandi | |
| 2014/0176098 A1 | 6/2014 | Fang et al. | |
| 2014/0210436 A1 | 7/2014 | Zhong et al. | |
| 2014/0223205 A1* | 8/2014 | Muthukaruppan | G06F 1/3243 713/320 |
| 2014/0241414 A1 | 8/2014 | Reidl | |
| 2014/0266100 A1 | 9/2014 | Cavallini et al. | |
| 2014/0266143 A1 | 9/2014 | Saint-Laurent et al. | |
| 2014/0269975 A1* | 9/2014 | Chong | H04L 25/028 375/295 |
| 2014/0277812 A1* | 9/2014 | Shih | G05F 1/46 700/297 |
| 2014/0340067 A1 | 11/2014 | Zhong et al. | |
| 2016/0111891 A1* | 4/2016 | Ayukawa | H02J 50/80 307/104 |
| 2016/0291617 A1* | 10/2016 | Nagatomo | G05F 1/46 |
| 2017/0315571 A1* | 11/2017 | Nagatomo | G05F 1/46 |
| 2017/0359119 A1 | 12/2017 | Li et al. | |
| 2019/0317536 A1* | 10/2019 | Liu | G05F 1/462 |

OTHER PUBLICATIONS

Bulzacchelli et al., "Dual-Loop System of Distributed Microregulators With High DC Accuracy, Load Response Time Below 500 ps, and 85-mV Dropout Voltage", 2012, IEEE Journal of Solid-State Circuits, vol. 47, No. 4, Apr. 2012. (Year: 2012).*

Final Office Action from U.S. Appl. No. 13/801,777 dated Apr. 21, 2016, 12 pgs.

Final Office Action from U.S. Appl. No. 13/801,777 dated Jun. 1, 2018, 14 pgs.

Non-Final Office Action from U.S. Appl. No. 13/801,777 dated Aug. 8, 2019, 17 pgs.

Non-Final Office Action from U.S. Appl. No. 13/801,777 dated Feb. 9, 2017, 14 pgs.

Non-Final Office Action from U.S. Appl. No. 13/801,777 dated Oct. 16, 2015, 15 pgs.

Non-Final Office Action from U.S. Appl. No. 13/801,777 dated Sep. 8, 2017, 13 pgs.

Notice of Allowance from U.S. Appl. No. 13/801,777 dated Feb. 24, 2020, 9 pgs.

Bowman, Keith et al., "Dynamic Variation Monitor for Measuring the Impact of Voltage Droops on Microprocessor Clock Frequency", IEEE 2010, 4 pgs.

Bulzacchelli, J., "Dual-Loop System of Distributed Microregulators with High DC Accuracy, Load Response Time Below 500ps and 85-mV Dropout Voltage", Apr. 2012, IEEE Journal of SS Circuits, 47.

Bulzacchelli, J.F. et al., "Dual-Loop System of Distributed Microregulators with High DC Accuracy, Load Response Time Below 500 ps and 85-mV Dropout Voltage", Apr. 2012.

Chen, W., "Dual-Loop Feedback for Fast Low Dropout Regulators", 2001, IEEE.

Chen, W. et al., "Switched-Capacitor Power Converters with Integrated Low Dropout Regulators", IEEE 2001.

Chen, Y.-C. et al., "Digital Controlled Low-Dropout Regulator with Fast-Transient and Autotuning Algorithms", Sep. 2013, IEEE Transactions on Power Electronics, vol. 28, No. 9.

Falconi, C. et al., "Dual Op Amp, LDO Regulator with Power Supply Gain Suppression for CMOS Smart Sensors and Microsystems", 2008, IEEE.

Hoon, S., "A Low Noise, High Power Supply Rejection Low Dropout Regulator for Wireless System-on-Chip Applications", 2005, IEEE 2005 Custom Integrated Circuits Conference.

Kim, Stephen T. et al., "Enabling Wide Autonomous DVFS in a 22 nm Graphics Execution Core Using a Digitally Controlled Fully Integrated Voltage Regulator", IEEE Journal of Solid-State Circuits, vol. 51, No. 1, Jan. 2016, 13 pgs.

Lee, Y-H. et al., "A20uA Quiescent Current Asynchronous Digital-LDO with PLL-Modulated Fast-DVS Power Management in 40nm CMOS for 5.6 times MIPS Performance", 2012 IEEE.

Lee, Yu-Huei et al., "A Single-Inductor Dual-Output (SIDO) Based Power Management with Adaptive Bus Voltage Modulation and Zero Cross-Regulation in 40nm CMOS", 2012 IEEE, 4 pgs.

Mazumdar, Kaushik et al., "A Digitally-Controlled Power-Aware Low-Dropout Regulator to Reduce Standby Current Drain in Ultra-Low-Power MCU", 2015 IEEE, 16th Int'l Symposium on Quality Electronic Design, 5 pgs.

Mazumdar, Kaushik et al., "Breaking the Power Delivery Wall using Voltage Stacking", GLSVLSI'12, May 2012, 4 pgs.

Milliken, R. et al., "Full On-Chip CMOS Low-Dropout Voltage Regulator", Sep. 2007, IEEE Transactions on Circuits and Systems—1: Regular Papers, vol. 54, No. 9.

Patel, A. et al., "High Power-Supply Rejection (PSR) Current-Mode Low-Dropout (LOO) Regulator", Nov. 2010, IEEE Transactions on Circuits and Systems—II: Express Briefs, vol. 57, No. 11.

Raychowdhury, Arijit et al., "Error Detection and Correction in Microprocessor Core and Memory Due to Fast Dynamic Voltage Droops", IEEE Journal on Emerging and Selected Topics in Circuits and Systems, vol. 1, No. 3, Sep. 2011, 10 pgs.

Shih, Yi-Chun et al., "a 2.3 uW Wireless Intraocular Pressure/Temperature Monitor", IEEE Journal of Solid-State Circuits, vol. 46, No. 11, Nov. 2011, 10 pgs.

Shih, Yi-Chun, "Low Power Wireless Integrated Circuits for Implantable Devices", University of Washington, 2012, 128 pgs.

Texas Instruments Inc., "Dual-Output, Low Dropout Voltage Regulators with Power-Up Sequencing for Split-Voltage DSP Systems", May 2000, Retrieved from the Internet at "www.ti.com."

Texas Instruments Inc., "Dual-Output, Low Dropout Voltage Regulators with Power-Up Sequencing for Split-Voltage DSP Systems—TPS70358M", Jun. 2009, Retrieved from the Internet at "www.ti.com."

Tokunaga, Carlos et al., "A Graphics Execution Core in 22nm CMOS Featuring Adaptive Clocking, Selective Boosting and State-Retentive Sleep", 2014 IEEE International Solid-State Circuits Conference, 3 pgs.

Wilkerson, Chris et al., "Trading off Cache Capacity for Reliability to Enable Low Voltage Operation", International Symposium on Computer Architecture, 2008 IEEE, 12 pgs.

Woligroski, Don, "Power Supply 101: A Reference of Specifications", Tom's Hardware online Magazine, Dec. 14, 2011, 6 pgs.

* cited by examiner

| Slow cycle # (701) | N,global (702) | Fast Cycle # (703) | N,local,1 (704) | N,local,2 (705) | N,total,1 (706) | N,total,2 (707) | ΣN,total (708) |
|---|---|---|---|---|---|---|---|
| | 0 | 1 | 1 | 1 | 1 | 1 | 2 |
| | 0 | 2 | 1 | 1 | 1 | 1 | 2 |
| | 0 | 3 | 1 | 1 | 1 | 1 | 2 |
| | 0 | 4 | 1 | 1 | 1 | 1 | 2 |
| 2 | 1 | 1~4 | 1 | 1 | 2 | 2 | 4 |
| 3 | 2 | 1~4 | 1 | 1 | 3 | 3 | 6 |
| 4 | 3 | 1~4 | 1 | 1 | 4 | 4 | 8 |
| 5 | 4 | 1~4 | 1 | 1 | 5 | 5 | 10 |
| 6 | 5 | 1 | 1 | 0 | 5+1=6 | 5 | 11 |
| | 5 | 2 | 0 | 0 | 5 | 5 | 10 |
| | 5 | 3 | 1 | 0 | 6 | 5 | 11 |
| | 5 | 4 | 0 | 0 | 5 | 5 | 10 |
| 7 | 5 | 1 | 1 | 0 | 6 | 5 | 11 |
| ...... | 5 | 2~4 | 0 or 1 | 0 or 1 | 5 or 6 | 5 or 6 | 10~12 |

Fig. 7

| Slow cycle # | N,global | Fast Cycle # | N,local,1 | N,local,2 | N,total,1 | N,total,2 | ΣN,total |
|---|---|---|---|---|---|---|---|
| 1 | 0 | 1~4 | 1 | 1 | 1 | 1 | 2 |
| 2 | 0.25 | 1~4 | 1 | 1 | 1.25 | 1.25 | 2.5 |
| 3 | 0.5 | 1~4 | 1 | 1 | 1.5 | 1.5 | 3 |
| 4 | 0.75 | 1~4 | 1 | 1 | 1.75 | 1.75 | 3.5 |
| 5 | 4.00 | 1~4 | 1 | 1 | 5 | 5 | 10 |
| 6 | 4.25 | 1 | 1 | 1 | 5.25 | 5.25 | 10.5 |
| 6 | 4.25 | 2 | 0 | 1 | 4.25 | 5.25 | 9.5 |
| 6 | 4.25 | 3 | 1 | 1 | 5.25 | 5.25 | 10.5 |
| 6 | 4.25 | 4 | 0 | 1 | 4.25 | 5.25 | 9.5 |
| 7 | 4.50 | 1 | 0 | 1 | 4.5 | 5.5 | 10 |
| 7 | 4.50 | 2 | 0 | 0 | 4.5 | 4.5 | 9 |
| 7 | 4.50 | 3 | 1 | 0 | 5.5 | 4.5 | 10 |
| 7 | 4.50 | 4 | 0 | 0 | 4.5 | 5.5 | 9 |

Fig. 8

| Slow cycle # | N,global | Fast Cycle # | N,local,1 | N,local,2 | N,total,1 | N,total,2 | Σ N,total |
|---|---|---|---|---|---|---|---|
| 1 | 2.5 | 1~4 | 0 | 0 | 2.5 | 2.5 | 5 |
| 2,3 | 2.25->2 | 1~4 | 0 | 0 | 2 | 2 | 4 |
| 4 | 1.75 | 1 | 0 | 1 | 1.75 | 2.75 | 4 |
|  | 1.75 | 2 | 0 | 0 | 1.75 | 1.75 | 3.5 |
|  | 1.75 | 3 | 0 | 1 | 1.75 | 2.75 | 4 |
|  | 1.75 | 4 | 0 | 0 | 1.75 | 1.75 | 3.5 |
| 5 | 1.75 | 1~4 | 0 or 1 | 0 or 1 | 1.75~2.75 | 1.75~2.75 | 3.5~4 |
| ... |  |  |  |  |  |  |  |

Fig. 9

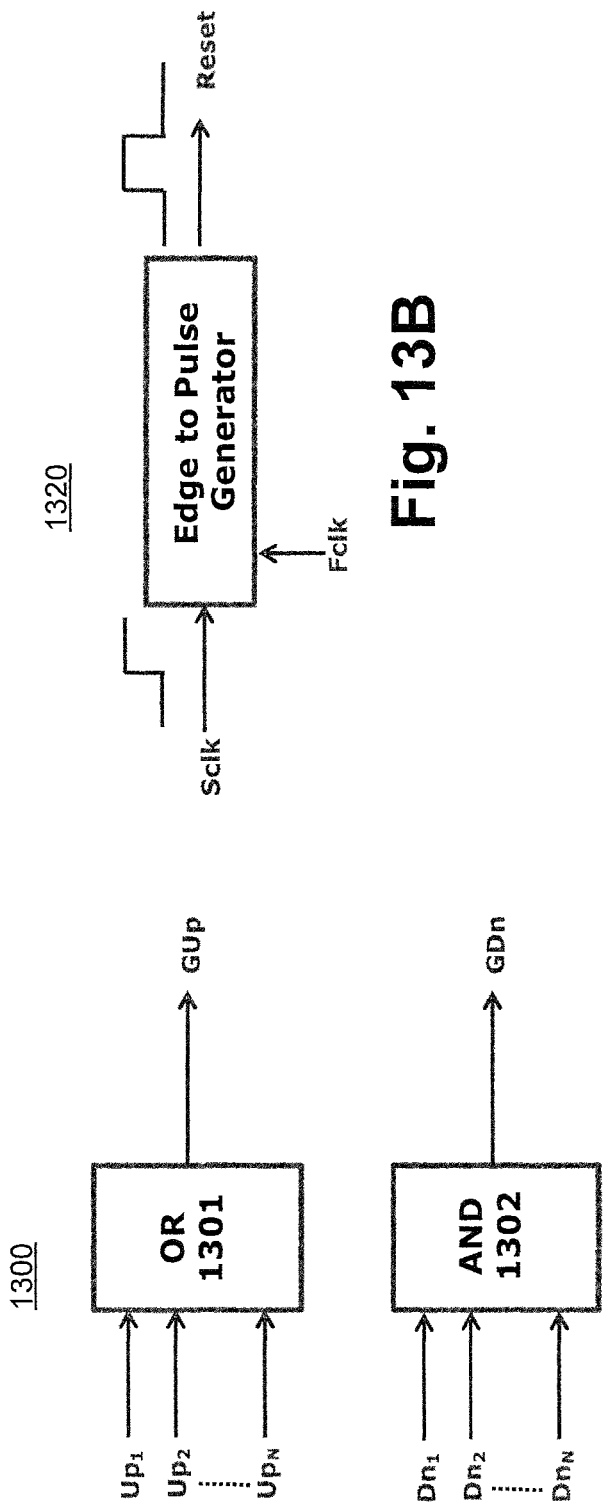
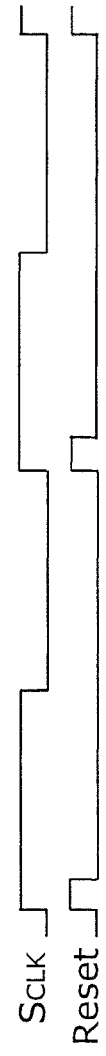
Fig. 13A
Fig. 13B
Fig. 13C

DUAL LOOP DIGITAL LOW DROP REGULATOR AND CURRENT SHARING CONTROL APPARATUS FOR DISTRIBUTABLE VOLTAGE REGULATORS

CLAIM FOR PRIORITY

This application is a continuation of, and claims the benefit of priority to U.S. patent application Ser. No. 13/801,777, filed on Mar. 13, 2013, titled "DUAL LOOP DIGITAL LOW DROP REGULATOR AND CURRENT SHARING CONTROL APPARATUS FOR DISTRIBUTABLE VOLTAGE REGULATORS," issued as U.S. Pat. No. 10,698,432 on Jun. 30, 2020 and which is incorporated by reference in entirety.

BACKGROUND

On die Low Drop-Out (LDO) regulator is emerging as a strong candidate to enable fine-grain voltage domains, where logic blocks of the same or different functionality, for example, execution units within a graphics core, or different logic blocks within a system on chip (SOC), have the autonomy to run at different frequency and supply levels (Vcc) at different times depending on workload needs and/or minimum operating voltage (Vmin) limits. An LDO can provide relatively high current density with a small area overhead compared to other bulkier Integrated Voltage Regulators (IVRs) like Switched-capacitor Voltage regulators (SCVRs) and inductor-based buck converters.

However, conventional LDOs use an analog amplifier for voltage monitoring and feedback control, making it less favorable to supply voltage and technology scaling. Furthermore, loop stability requirement (of the feedback) and power budget often set a limit on the bandwidth of the conventional LDO, thus degrading the voltage regulation to large load transients.

When multiple conventional LDOs are connected to the same power grid (of a large voltage domain), non-idealities like offsets (amongst conventional LDO amplifiers, for example) can cause current crowding in certain logical sub-blocks, incurring reliability concerns and LDO performance degradation. Furthermore, interaction between conventional LDO blocks via the power grid complicates stability analysis under various load conditions and process temperature, and voltage (PVT) variations.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 7 is an example illustrating the operation of the distributed DLDO architecture with globally controlled current sharing, according to one embodiment of the disclosure.

FIG. 8 is another example illustrating the operation of the distributed DLDO architecture with globally controlled current sharing, according to one embodiment of the disclosure.

FIG. 9 is another example illustrating the operation of the distributed DLDO architecture with globally controlled current sharing, according to one embodiment of the disclosure.

FIGS. 13A-C are logic blocks of the global controller used for controlled current sharing in the distributable DLDO architecture, according to one embodiment of the disclosure.

DETAILED DESCRIPTION

Figure 1:
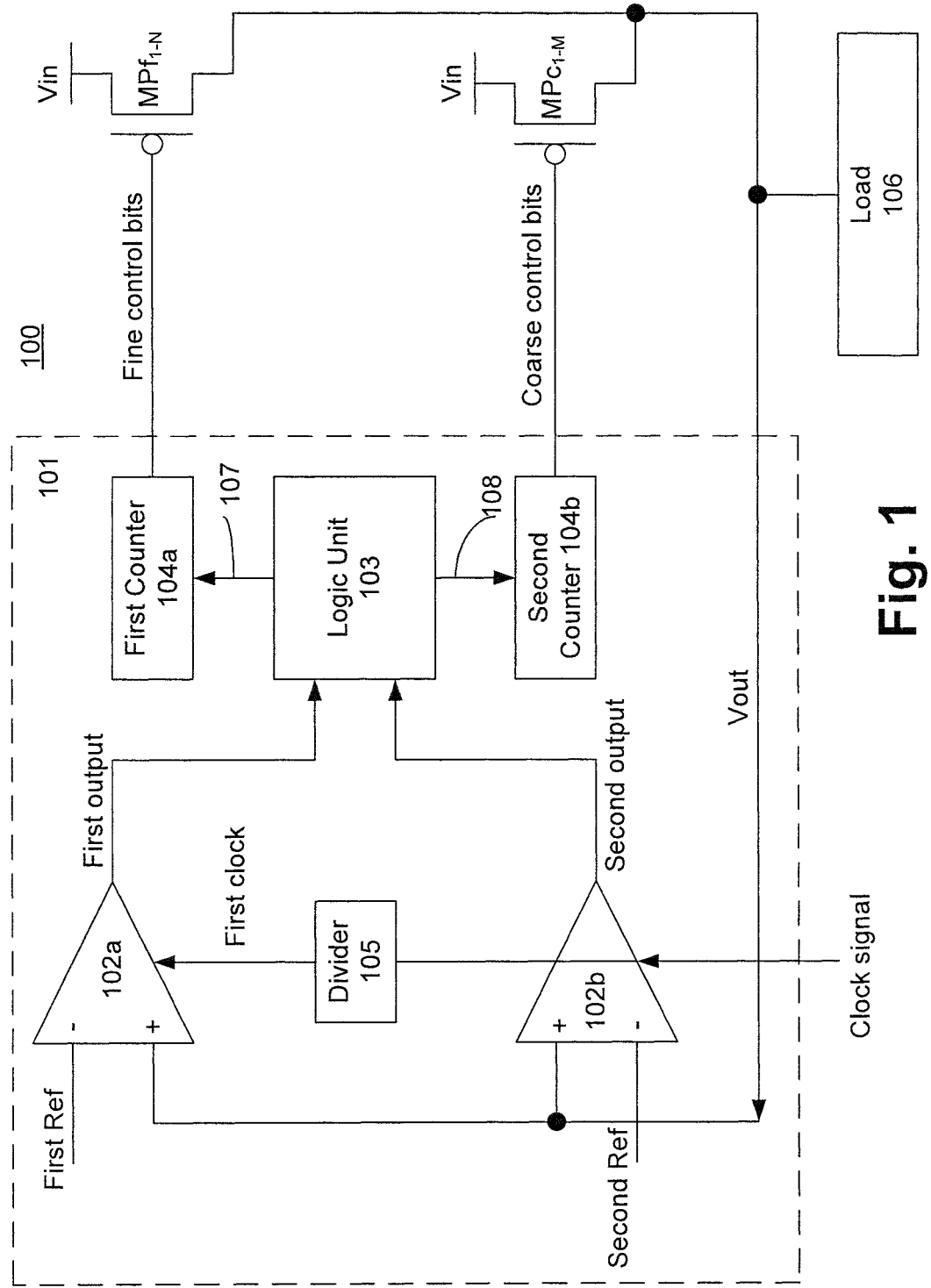
FIG. 1 is a dual-loop digital low dropout (DLDO) voltage regulator (VR) architecture, according to one embodiment of the disclosure.

The embodiments describe a digitally-controlled LDO (DLDO) voltage regulator (VR) with a fast transient response time (approximately in the nanosecond range), high current efficiency (e.g., greater than 99% at high loads), and high current density. In one embodiment, the DLDO VR includes two loops (i.e., dual-loop DLDO VR). In one embodiment, a controller of the dual-loop DLDO VR comprises standard cell logic gates and digitally clocked latch-type comparators to facilitate technology scaling and to improve time-to-market. In one embodiment, the dual-loop DLDO VR can be used as a standalone DLDO VR or integrated with an SCVR (Switched-capacitor voltage regulator) which extends respectable efficiency at the low output voltage range. In one embodiment, the dual-loop DLDO VR comprises an up/down counter with a control scheme which allows the DLDO VR to operate at higher frequencies (e.g., 1 to 2 GHz) for fast load transient response compared to other schemes (e.g., proportional integral derivative scheme).

In one embodiment, the dual-loop DLDO VR scheme allows simultaneous optimization of transient response and steady-state ripple while maximizing efficiency of the voltage regulator. In one embodiment, this is done by optimally selecting clock frequency, step-size, and total number of steps separately for a fine-grain counter (to minimize ripple) and a course-grain counter (to minimize droop on the output node of the VR). Other technical effects will be evident by the embodiments.

In one embodiment, a distributable control scheme for multiple DLDO VRs is used for supplying the same voltage to multiple logic units. In one embodiment, in the distributable DLDO VR scheme, a global controller enforces current sharing between local-DLDO VRs to avoid current crowding while maintaining stability and fast droop response time (approximately in the nanosecond range). In one embodiment, the globally synchronous and locally asynchronous current-sharing scheme allows for fast local voltage regulation while ensuring global stability among the distributed DLDO VRs.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" may generally refer to converting a design (schematic and layout) from one process technology to another process technology. The term "scaling" generally may also refers to downsizing layout and devices within the same technology node. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

A typical DLDO VR regulates an output voltage (coupled to a load) by digitally modulating the number of power devices that are turned on to deliver current to the load. At each DLDO clock cycle, a controller of the DLDO compares output voltage to a reference voltage (Vref), and adjusts the supply current up or down by digitally changing number of switched-on PMOS power stages (coupled between an input supply and output node coupled to the load), thus providing output voltage regulation.

A slow sampling DLDO clock is generally used to reduce the DLDO VR's self-generated steady-state output ripple, from stability point of view, and to decrease DLDO VR controller power to improve its current efficiency. On the other hand, slow DLDO clock trades-off start-up time as well as response time to fast transients, increasing voltage droop on output node and thus required power supply margin (for the power supply regulated by the DLDO VR). In addition, the step size (gain) of the power stage plays a role in the magnitude of the DLDO VR's steady-state ripple as well as its transient response time. For example, smaller step size (i.e., implying larger total number of steps, N, for a given maximum load current) generally reduces steady state ripple on the output node (coupled to the load) but also slows response to large current transients.

FIG. 1 is a dual-loop DLDO VR 100, according to one embodiment of the disclosure. The dual-loop DLDO VR 100 decouples the competing design parameters discussed above with reference to typical DLDO VRs by combining fine and coarse control schemes to achieve minimum (or reduced) steady-state output ripple compared to output ripple of traditional DLDO VRs while also minimizing (or reducing) DLDO VR response time. In one embodiment, dual loop DLDO VR 100 allows simultaneous optimization of the transient response and steady-state ripple while maximizing (i.e., improving) DLDO VR efficiency.

In one embodiment, dual-loop DLDO VR 100 comprises controller 101 and a plurality of power drivers $MPf_{1-N}$ and $MPc_{1-M}$, where 'N' and 'M' are integers, which provide regulated supply Vout to a load 106. In one embodiment, N=12 and M=3. In another embodiment, other values for N and M can be used to achieve a certain performance of dual-loop DLDO VR 100. Performance of dual-loop DLDO VR 100 may be based on factors such as output ripple on output node Vout, loop stability for both loops, current efficiency for a given load 106, current target, etc. In one embodiment, the plurality of power drivers is p-type devices. However, the embodiments can also be implemented using n-type power devices. In such an embodiment, controller 101 is modified to properly drive the n-type power devices.

In one embodiment, controller 101 comprises a first comparator 102a forming a first loop, and a second comparator 102b forming a second loop. In one embodiment, first comparator 102a compares output voltage Vout (on node Vout) against a First reference (Ref) voltage to generate First output which indicates whether Vout is above or below First Ref. In one embodiment, second comparator 102b compares output voltage Vout (on node Vout) against a Second Ref voltage to generate Second output which indicates whether Vout is above or below Second Ref.

In this embodiment, First Ref is different than the Second Ref. In one embodiment, Second Ref is smaller in voltage level than First Ref. For example, if First Ref is denoted as Vref then Second Ref is Vref−ΔV, where ΔV is a delta voltage for detecting voltage droop in Vout. In such an embodiment, second comparator 102b monitors for any large voltage droop on node Vout for faster correction of Vout to steady state level. In one embodiment, first comparator 102a monitors voltage on node Vout for any small changes in voltage level in Vout relative to First Ref.

In one embodiment, controller 101 comprises Logic Unit 103 coupled to first and second comparators 102a and 102b. In one embodiment, controller 101 comprises First Counter 104a to generate Fine control bits to control first set of power drivers $MPf_{1-N}$. In one embodiment, controller 101 comprises Second Counter 104b to generate Coarse control bits to control second set of power drivers $MPc_{1-M}$. In one embodiment, First Counter 104a is a 12-bit counter to generate 12 bits of Fine control bits. In one embodiment, Second Counter 104b is a 3-bit counter to generate 3 bits of Coarse control bits. In other embodiments, other sizes for First and Second Counters (104a and 104b) may be used to achieve the performance targets of the dual-loop DLDO VR.

In one embodiment, first loop (also called Fine loop) is formed by first comparator 102a, Logic Unit 103, First Counter 104a, and first set of power drivers $MPf_{1-N}$. In one embodiment, second loop (also called Coarse loop) is formed by second comparator 102b, Logic Unit 103, Second Counter 104b, and second set of power drivers $MPc_{1-N}$. In one embodiment, controller 101 comprises Divider 105 which divides frequency of clock signal to generate first clock signal. In such an embodiment, first and second comparators are clocked comparators, where first comparator 101a is clocked by first clock signal having frequency lower than Clock signal (also called second clock signal) received by second comparator 101b. In one embodiment, Divider 105 is a configurable or programmable clock divider. For example, Divider 105 can divide Clock signal by 1, 2, 4, 8, etc. to accommodate different load capacitance and physical size. The term "clock comparators" generally refers to comparators whose output is updated every clock cycle or transition of a clock cycle.

In one embodiment, Logic Unit 103 receives First output and Second output to determine whether a fast correction of Vout needs to be made in case of a voltage droop on Vout. In such an embodiment, Logic Unit 103 sends a signal 108 to Second Counter 104b to count up or down (Dn) to generate Coarse control bits. In one embodiment, Logic Unit 103 determines that there is no voltage droop on Vout. In such an embodiment, Logic Unit 103 generates signal 107 for First Counter 104a to count up or down to generate Fine control bits. In one embodiment, Fine control bits are used for small adjustment of Vout level by turning on or off $MPf_{1-N}$. In contrast, Coarse control bits are used for larger adjustment of Vout level by turning on or off $MPc_{1-M}$.

In one embodiment, first comparator 102a in the fine loop compares the output voltage Vout to First Ref (e.g., Vref) at each clock cycle of First clock. The result (i.e., First output) of first comparator 102a is used to increment or decrement First Counter 104a (also called a fine-grain (FG) up/down counter), which controls the number of switched-on p-type power stages $MPf_{1-N}$. When Vout<Vref, First Counter 104a increments, switching on more power stages $MPf_{1-N}$ to raise voltage level of Vout. When Vout>Vref, First Counter 104a decrements, turning off power stages $MPf_{1-N}$ successively until Vout voltage level returns to Vref (or substantially close to Vref). Thus, the output voltage Vout is regulated around the reference voltage Vref by the fine loop.

In one embodiment, the fine loop is operational during steady-state condition. In one embodiment, dual-loop DLDO VR 100 reduces output ripple on Vout by using a slow clock (i.e., First clock signal with lower frequency than Clock signal used for second comparator 102b). A slow First clock signal reduces switching loss and issues related to loop instability. In one embodiment, the fine loop also reduces output ripple on Vout by causing a small current step size from $MPf_{1-N}$ by making each of the transistors $MPf_{1-N}$ small in size and controllable by Fine control bits. In one embodiment, when a voltage droop is detected on Vout (i.e., dual-loop DLDO VR is no longer operating in steady state), the second loop uses a fast sampling clock (Clock signal) to quickly detect the droop event (compared to the first loop) and quickly brings Vout substantially close to Vref using Coarse control bits for controlling current step size provided by $MPc_{1-M}$. In one embodiment, current step size of $MPc_{1-M}$ is larger than the current step size of $MPf_{1-N}$. This means that one bit of Coarse control bits causes more current change (and thus voltage change to Vout) than a change in bit of Fine control bits.

In one embodiment, second comparator 102b in coarse loop with a lower threshold voltage (Vref−ΔV) (also called Second Ref) is used to detect large droop events on Vout. A large droop event may be a voltage droop of 20+mV from normal Vout level. In one embodiment, to accommodate a wide range of di/dt load steps, the effective strength $MPc_{1-M}$ is increased adaptively on demand when Vout<Vref−ΔV. In one embodiment, the effective strength $MPc_{1-M}$ is controlled by Second Counter 104b. When a droop is detected (i.e., Vout<Vref−ΔV), Second Counter 104b increments and turns on additional power stages from among $MPc_{1-M}$ until the droop on Vout is recovered (i.e., Vout≥Vref−ΔV). In one embodiment, the current step size per Coarse control bit is four times larger than that of Fine control bit to recover droops quickly. In other embodiments, current step size per Coarse control bit can be more or less than four times larger than that of Fine control bit.

In one embodiment, the separation of the threshold voltages of the first and second comparators (102a and 102b) avoids triggering or updating of the Coarse control bits in steady load condition. In one embodiment, ΔV=20 mV. In other embodiments, ΔV can be more or less than 20 mV. In one embodiment, to reduce the response time of controller 101 when a droop event occurs on Vout, the sampling rate of first comparator 102a can be increased by reducing the dividing ratio of the divider 105. In one embodiment, first comparator 102a is clocked at the same frequency as Clock signal for second comparator 102b when a droop event occurs on Vout. In one embodiment, Clock signal has a frequency of 2 GHz. In other embodiments, other frequencies of Clock signal may be used.

First Counter 104a for controller 401 has a different step-size than Second Counter 104b. In one embodiment, step-size of First Counter 104a is smaller than step-size of Second Counter 104b. For example, step size of First Counter 104a is one while step-size of Second Counter 104b is four for fast droop response.

Figure 2:
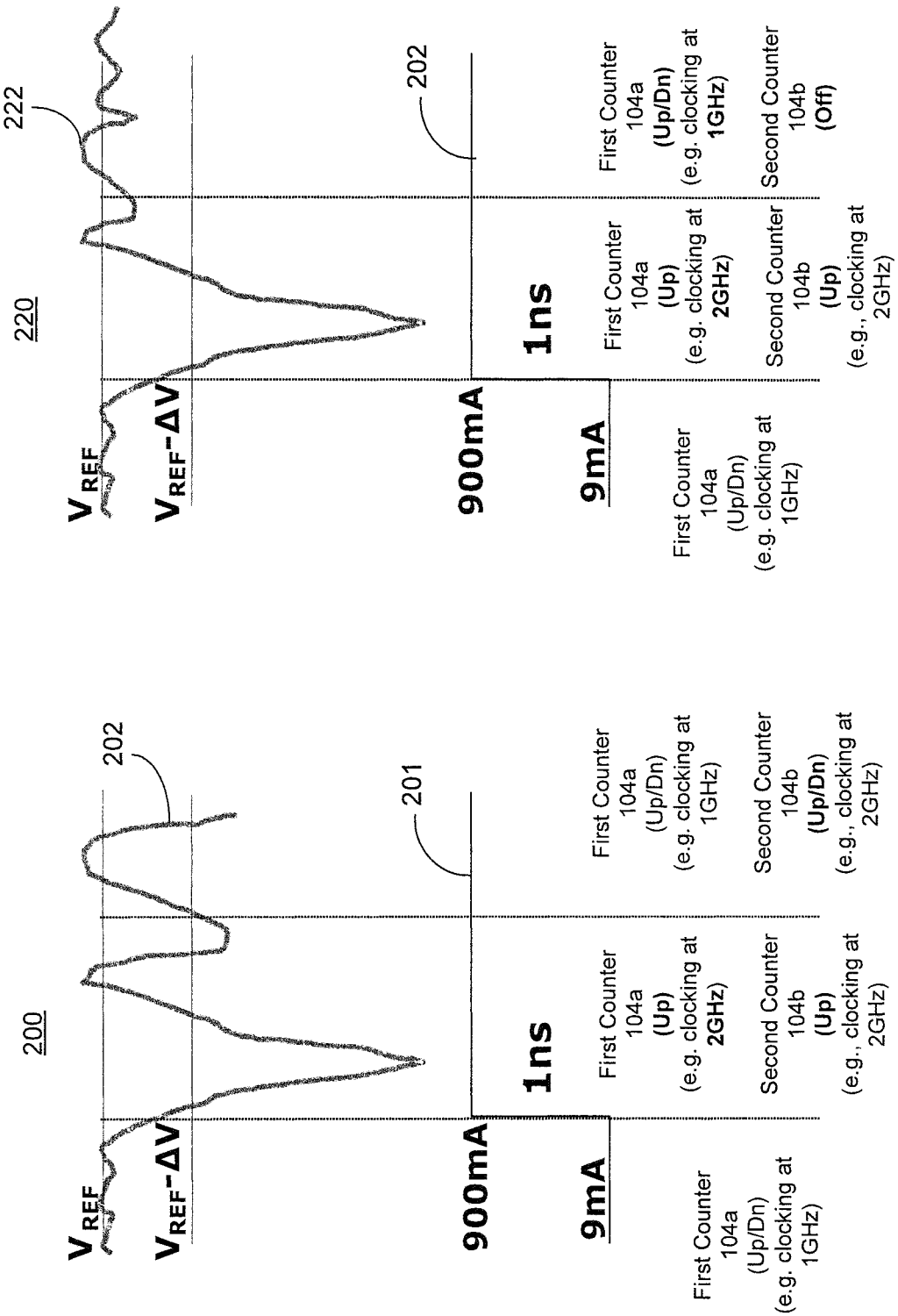
FIGS. 2A-B are waveforms showing step response and settling of output of the dual-loop DLDO VR, according to one embodiment of the disclosure.

FIGS. 2A-B are plots 200 and 220 showing step response and settling of output of dual-loop DLDO VR 100, according to one embodiment of the disclosure. It is pointed out that those elements of FIGS. 2A-B having the same reference numbers (or names) as the elements of any other figure can operate or function in any manner similar to that described, but are not limited to such. FIG. 2A shows the case when no adaptive clocking is applied to first comparator 102a and First Counter 104a. FIG. 2B shows the case when adaptive clocking is applied. In this embodiment, first comparator 102a and First Counter 104a switch to a higher frequency operation during a droop event on Vout compared to when there is no droop on Vout.

In one embodiment, to ensure a smooth transition from the second loop to the first loop, the first loop temporarily switches to a transitional state when the second loop is kicked in. In one embodiment, First Counter 104a in this transitional state counts up regardless of the voltage level of First output from first comparator 102a. In one embodiment, the clock frequency of First clock is increased to the maximum input clock frequency during the transitional state. Once the transitional state is over (i.e., droop dies out), the frequency of First clock is made lower than Clock signal (i.e., Second clock).

Plot 200 shows the steady state, droop state, and oscillation state when no transitional state is used. The x-axis is time while the y-axis is voltage from waveform 202 and current from waveform 201. In this example, a current in the form of a step function 201 (from 9 mA to 900 mA in 1 ns) is drawn by load 106. Such current draw causes a voltage droop on Vout as shown by waveform 202. Plot 200 is partitioned into three sections.

The left most section indicates a steady state condition when the first loop of dual-loop DLDO VR 100 is operating while the second loop is off or disengaged because Vout is much higher than Vref−ΔV. In this example, First clock operates a 1 GHz frequency and First Counter 104a counts Up or Down using First clock signal.

The middle section of plot 200 indicates the case when Vout is less than Vref−ΔV. In this section, the second loop engages along with the first loop. In this example, second comparator 102b is clocked by Clock signal (e.g., 2 GHz) and Second Counter 104b counts up every Clock signal (i.e., 2 GHz), while first loop continues to operate with First Clock at 1 GHz (half as slow as the Clock signal). In the embodiments, First Counter 104a operates at the same clock frequency as first comparator 102a. The second loop assists dual-loop DLDO VR 100 to bring Vout above Vref−ΔV as quick as possible.

The right most section of plot 200 shows the effect of not having a transition state. In this example, Vout oscillates around Vref and Vref−ΔV. In this example, both first and second loops continue to operate because Vout oscillates around Vref and Vref−ΔV after the droop on Vout is resolved.

Plot 220 shows the steady state, droop state, and transition state to reduce large scale oscillations as shown in the oscillation state of waveform 222. The x-axis is time while the y-axis is voltage from waveform 222 and current from waveform 221. In this example, a current in the form of a step function 221 (from 9 mA to 900 mA in 1 ns) is drawn by load 106. Such current draw causes a voltage droop on Vout as shown by waveform 222. Plot 220 is partitioned into three sections.

The left most section of plot 220 indicates a steady state condition when the first loop of dual-loop DLDO VR 100 is operating while the second loop is off or disengaged because Vout is much higher than Vref−ΔV. In this example, First clock operates at 1 GHz frequency and First Counter 104a counts Up or Down using First clock signal.

The middle section of plot 220 indicates the case when Vout is less than Vref−ΔV. In this section, the second loop engages along with the first loop. In this example, second comparator 102b is clocked by Clock signal (e.g., 2 Hz) and Second Counter 104b counts up every Clock signal (i.e., 2 GHz) when Vout is lower than Vref−ΔV. In one embodiment, the First Counter 104a continues to count up regardless of output of first comparator 102a for certain duration (e.g., two Second Clock cycles after Vout recovers to be above Vref−ΔV) to avoid the oscillation state in plot 200. In one embodiment, first loop continues to operate but at higher clock frequency. For example, first loop operates at the same frequency as the second loop. The first and second loops assist dual-loop DLDO VR 100 to bring Vout above Vref−ΔV as quick as possible without leading to large oscillations as seen in waveform 202.

The right most section of plot 220 shows the effect of having a transition state. In this example, Vout oscillates around Vref. In this example, since droop on Vout is resolved, second loop is off or disengaged because Vout is well above Vref−ΔV. In this embodiment, first loop reverts back to steady state operation using First clock which is slower than Clock signal used by the second loop.

Plot 220 shows that transitional state reduces the droop settling time and provides a smoother transition from the second loop to the first loop. In this embodiment, first loop begins to operates in steady state mode (i.e., with First clock being at slower frequency than Clock signal) after a predetermined number of Clock cycles.

Figure 3:
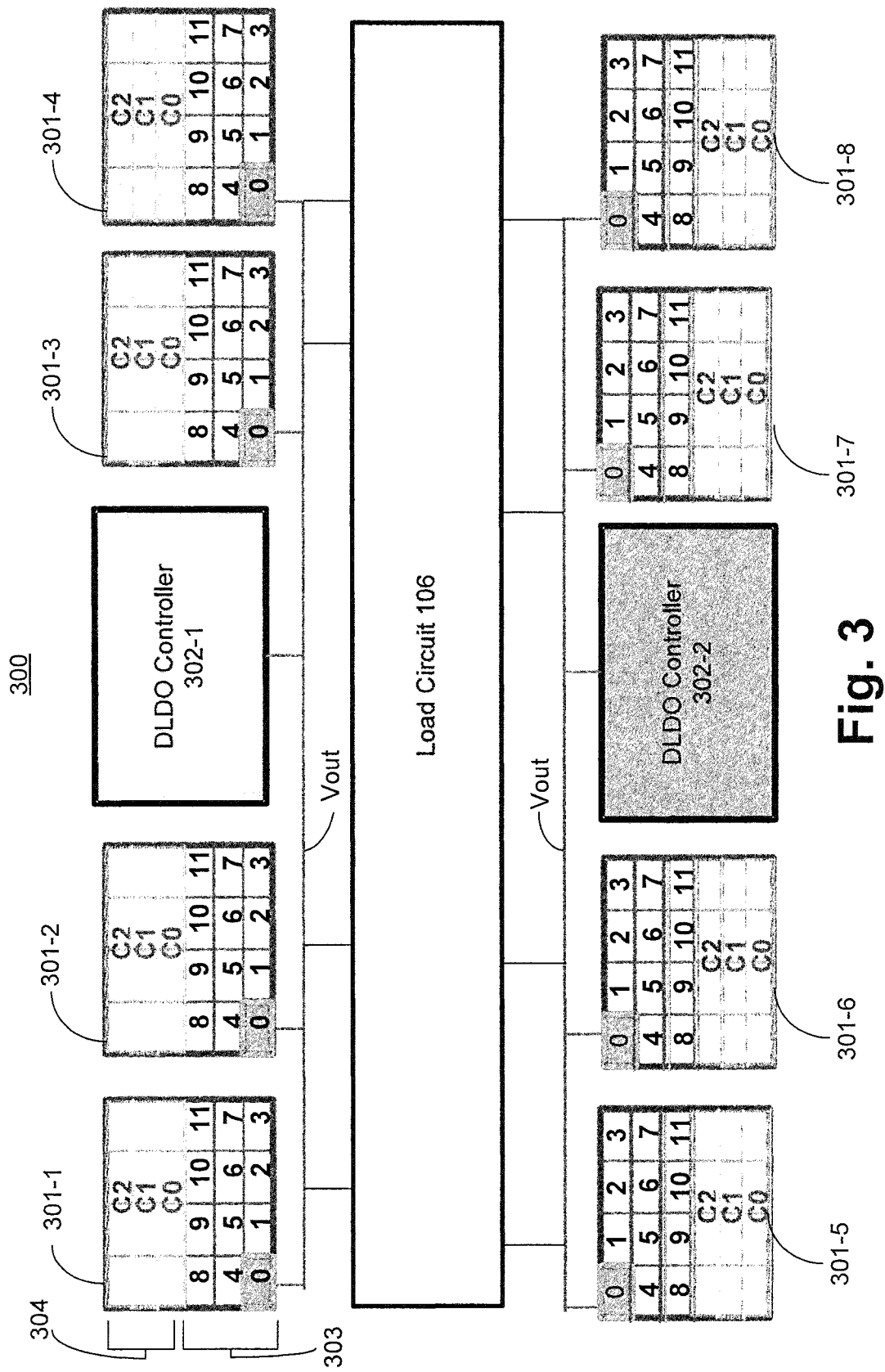
FIG. 3 is a partitioning architecture of the dual-loop DLDO VR, according to one embodiment of the disclosure.

FIG. 3 is a partitioning architecture 300 of dual-loop DLDO VR 100, according to one embodiment of the disclosure. It is pointed out that those elements of FIG. 3 having the same reference numbers (or names) as the elements of any other figure can operate or function in any manner similar to that described, but are not limited to such.

Architecture 300 shows Load Circuit 106 (same as load 106) which is supplied with regulated voltage Vout by dual-loop DLDO VR 100 which is partitioned north and south of Load Circuit 106. So as not to obscure the embodiment, all components of dual-loop DLDO VR 100 are not shown. In this exemplary embodiment, controller 101 is partitioned as DLDO Controller 302-1 to the north of Load Circuit 106, and DLDO Controller 302-2 to the south of Load Circuit 106. In this embodiment, the plurality of power gates (or transistors) $MPf_{1-N}$ and $MPc_{1-M}$ are also partitioned north and south of Load Circuit 106. In this example, N=12 and M=3. $MPf_{1-N}$ are partitioned in sections 301-1 to 301-8, where 301-1 to 301-4 are north of Load Circuit 106 and 301-5 to 301-8 are south of Load Circuit 106. Each of the partitioned sections of the plurality of power gates (or transistors) $MPf_{1-N}$ and $MPc_{1-M}$ are coupled to the output node Vout which is coupled to Load Circuit 106.

In this embodiment, $MPf_{1-N}$ are represented by 303 while $MPc_{1-M}$ are represented by 304. Each of the 12 boxes of 303 correspond to each transistor of $MPf_{1-N}$ (where N=12), and each of the partitioned section includes a portion of each transistor of $MPf_{1-N}$. For example, $MPf_1$ (which corresponds to box labeled '0') is equally divided into sections 301-1 to 301-8. Each of the 3 shaded rows of 304 correspond to each transistor of $MPc_{1-M}$ (where M=3). For example, $MPc_1$ (which corresponds to box labeled 'C0') is equally divided into sections 301-1 to 301-8. In this example, $MPc_1$ (i.e., box C0) has a size which is the size of $MPf_{1-4}$ combined (i.e., boxes labeled '0' to '3' combined).

In this embodiment, two sets of first comparators (e.g., 102a) and First Counters (e.g., 104a) are used, one in DLDO Controller 302-1 and the other in DLDO Controller 302-2. Likewise, in this embodiment, two sets of second comparators (e.g., 102b) and Second Counters (e.g., 104b) are used, one in DLDO Controller 302-1 and the other in DLDO Controller 302-2. In one embodiment, the two sets of First Counters are clocked simultaneously in phase to emulate non-partitioned First Counter 104a of dual-loop DLDO architecture 100. In one embodiment, the two sets of Second Counters are clocked simultaneously in phase to emulate non-partitioned Second Counter 104b of dual-loop DLDO architecture 100. In one embodiment, the first and second comparators of DLDO Controller 302-1 are clocked with clock signals (First Clock and Clock signal respectively) which are out of phase (e.g., by 180 degrees) from clock signals used to clock first and second comparators of DLDO Controller 302-2. In such an embodiment, droop response is further improved because the effective sampling rate for the comparators is doubled. In one embodiment, the first comparator (e.g., 102a) of DLDO Controller 302-1 is clocked in phase with the clock signal used to clock first comparator (e.g., 102a) of DLDO Controller 302-2. In one embodiment, the second comparator (e.g., 102b) of DLDO Controller 302-1 is clocked out of phase (e.g., by 180 degrees) from clock signal used to clock second comparator (e.g., 102b) of DLDO Controller 302-2. In such an embodiment, droop response is further improved because the effective sampling rate for the first and second comparators is doubled, while emulating non-partitioned First Counter 104a of dual-loop DLDO architecture 100.

For a wide Vout range, as Vout is reduced, the Vds of the p-type power stage devices ($MPf_{1-N}$ and $MPc_{1-M}$) increase. This changes the output current (gain) per step, and may change the loop dynamics i.e., current step size becomes dependent on the desired output voltage Vout. In one embodiment, gain per step is adjusted by adjusting the width of the p-type power stage devices controlled by First and Second Counter 104a and 104b depending on Vout range. In such an embodiment, a flatter current gain/step and output ripple across a wide Vout range is maintained, for example, Vout range from 0.5V to 0.95V.

For example, at high Vout levels from 0.95V-0.85V, the granularity may be set high (e.g., one), and each Fine control bit and Coarse control bit in the north and south regions controls the maximum width of the p-type power stage devices (e.g., 301-1 to 301-8). In contrast, at low Vout levels from 0.7V-0.5V for example, the granularity may be set low (e.g., 0.25), and each Fine control bit and Coarse control bit controls only a quarter of the p-type power stage device. Such adjustment of current step size reduces ripple on Vout across a wide range (e.g., 0.5V to 0.95V) of Vout.

Figure 4:
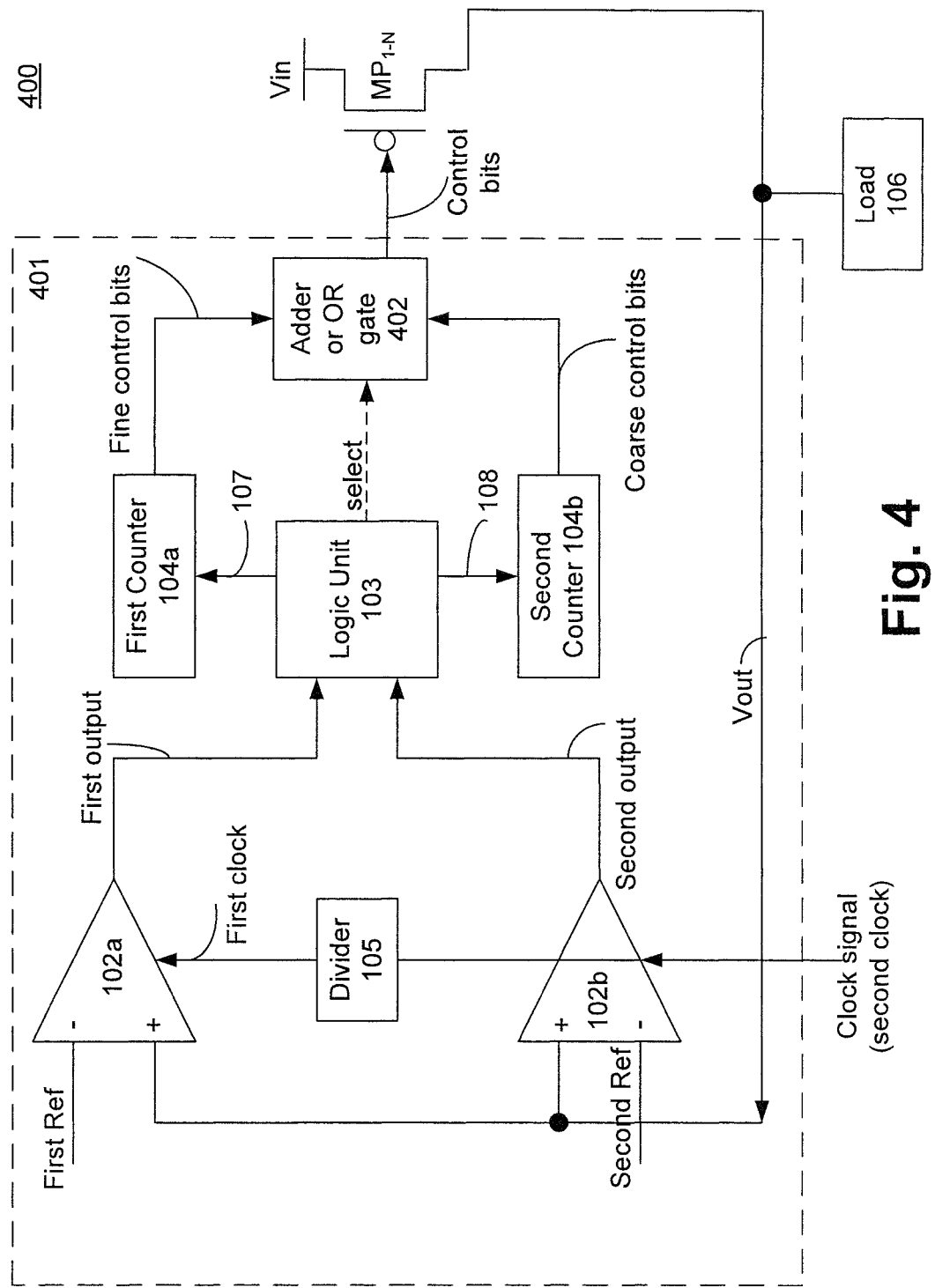
FIG. 4 is a dual-loop DLDO VR architecture, according to another embodiment of the disclosure.

FIG. 4 is a circuit of dual-loop DLDO VR architecture 400, according to another embodiment of the disclosure. It is pointed out that those elements of FIG. 4 having the same reference numbers (or names) as the elements of any other figure can operate or function in any manner similar to that described, but are not limited to such. So as not to obscure the embodiment of dual-loop DLDO VR architecture 400, differences between dual-loop DLDO VR architecture 100 and dual-loop DLDO VR architecture 400 are discussed.

In one embodiment, dual-loop DLDO VR architecture 400 comprises controller 401 and one set of power devices $MP_{1-N}$, where 'N' is an integer greater than '1.' In one embodiment, controller 401 comprises adder or OR functional logic gate 402. In this embodiment, output (Fine control bits) of First Counter 104a is received as first input signal for adder or OR functional logic gate 402 while output (Coarse control bits) of Second Counter 104b is received as second input signal for adder or OR functional logic gate 402. In one embodiment, the output of the first and second counter is thermally coded. In that embodiment, adder or OR functional logic gate 402 is a logical OR gate. For example, if count value of First Counter 104a is 2 in thermal code (i.e., 11000000) and count value of Second Counter 104b is 4 in thermal code but in reversed order (i.e., 00001111), the OR operation results in 11001111, which means 6 out of 8 transistors of $MP_{1-N}$ are turned on. In one embodiment, output of adder or OR functional logic gate 402 are Control bits for controlling which transistors among $MP_{1-N}$ are turned on or off to regulate Vout.

In one embodiment, First Counter 104a for controller 401 has a different step-size than Second Counter 104b. In one embodiment, step-size of First Counter 104a is smaller than step-size of Second Counter 104b. For example, step size of First Counter 104a is one while step-size of Second Counter 104b is four for fast droop response. The term "step-size" corresponds to effective turned on of off area of $MP_{1-N}$ per control bit. In one embodiment, the weightings of First counter 104a for controller 401 in the adder or OR functional logic 402 is different from weightings of Second Counter 104b. For example, 1 bit in Second Counter 104b is four times the weight than that of First Counter 104a in the adder or OR functional logic block 402.

Figure 5:
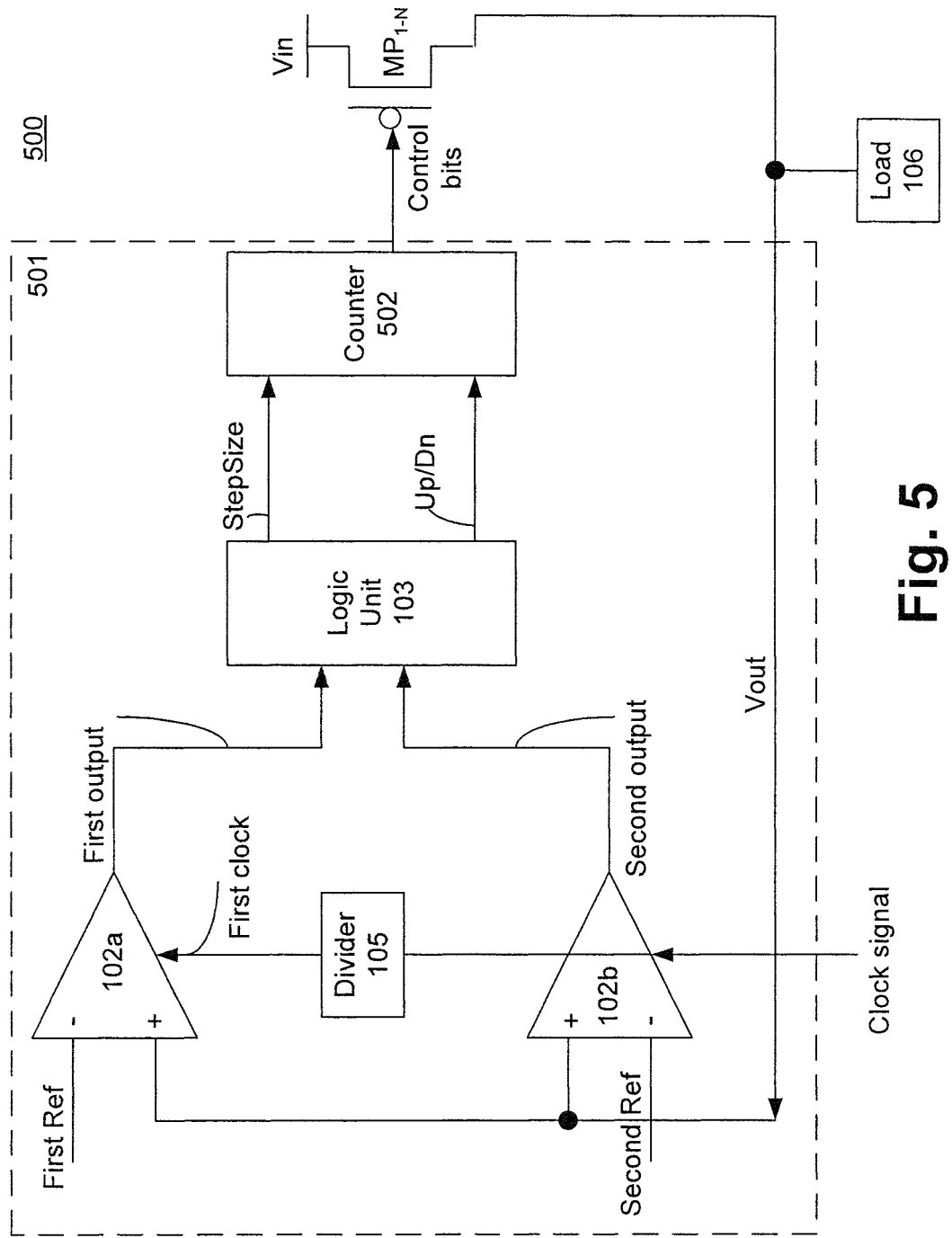
FIG. 5 is a dual-loop DLDO VR architecture with shared counter, according to another embodiment of the disclosure.

FIG. 5 is a circuit of dual-loop DLDO VR architecture 500 with shared counter, according to another embodiment of the disclosure. It is pointed out that those elements of FIG. 5 having the same reference numbers (or names) as the elements of any other figure can operate or function in any manner similar to that described, but are not limited to such. So as not to obscure the embodiment of dual-loop DLDO VR architecture 500, differences between dual-loop DLDO VR architecture 100 and dual-loop DLDO VR architecture 500 are discussed.

In one embodiment, dual-loop DLDO VR architecture 500 comprises controller 501 to control one set of p-type devices $MP_{1-N}$. In this embodiment, First and Second Counters 104a and 104b are removed and replaced with a single Up/Down Counter 502. In one embodiment, Logic Unit 103 determines from the outputs of first and second comparators 102a and 102b whether Vout is in steady state or in a droop. In one embodiment, Logic Unit 103 then determines the appropriate step size for Counter 502 and also whether Counter 502 should count up or down. In one embodiment, output (Control bits) of Counter 502 controls which transistors among $MP_{1-N}$ are turned on or off to regulate Vout.

In one embodiment, Logic Unit 103 sets the step-size of Counter 502 to a smaller step size when Logic Unit 103 determines that there is no droop event (e.g. Vout>Vref−ΔV). During a droop event (e.g. Vout<Vref−ΔV), Logic Unit 103 sets a larger step size of Counter 502 to quickly turn on more transistors of $MP_{1-N}$ to recover from the droop.

As discussed above, at each DLDO VR clock cycle, the controller of that DLDO compares Vout to Vref, and adjusts the supply current either up or down by digitally changing the number 'N' of switched-on p-type power gates, thus achieving output voltage regulation. The output voltage step size for a fixed N may be determined by the available number of p-type devices and associated signal routings. In one embodiment, where the output voltage resolution requirement is smaller than the available step size, the use of hysteric control can provide the dithering of N to achieve a fine output voltage resolution. At steady state in hysteric control mode, the DLDO toggles around a target value, generating a small output ripple.

The maximum area that can be supplied by a single DLDO controller is limited by various constraints like response time, IR (power) drop, device/via/metal self-heating and electro-migration reliability conditions, etc. In one embodiment, when a voltage domain exceeds any of these upper limits, multiple DLDOs are used to supply the same voltage domain.

In one embodiment, a continuous power grid is used which maintains the legacy of power grid design. When multiple local DLDO VRs are connected to the same power grid (of a large power supply voltage domain), non-idealities like offsets (amongst local DLDO VR digital comparators for example) can cause current crowding in certain sub-blocks, incurring reliability concerns and DLDO VR performance degradation. Furthermore, interaction between local DLDO VR via the power grid complicates stability analysis under various load conditions and PVT variations.

When multiple DLDO VR tiles, each with their own local controller, are connected to the same power grid, they can interact with each other through the power grid and raise stability or current crowding concerns. Regarding stability, ideally each DLDO VR may toggle between at most two adjacent states (N and N+1) in steady state condition. Similar to analog LDO VRs, DLDO VRs can potentially suffer stability issues that would aggravate the self-generated ripple. For a large voltage domain with multiple DLDO VRs, the stability analysis becomes even more complicated with interactions between DLDO VRs through the shared power grid. In addition, any offset between the DLDO VRs can result in current crowding in certain tiles, degrading reliability, and regulation performance.

Figure 6:
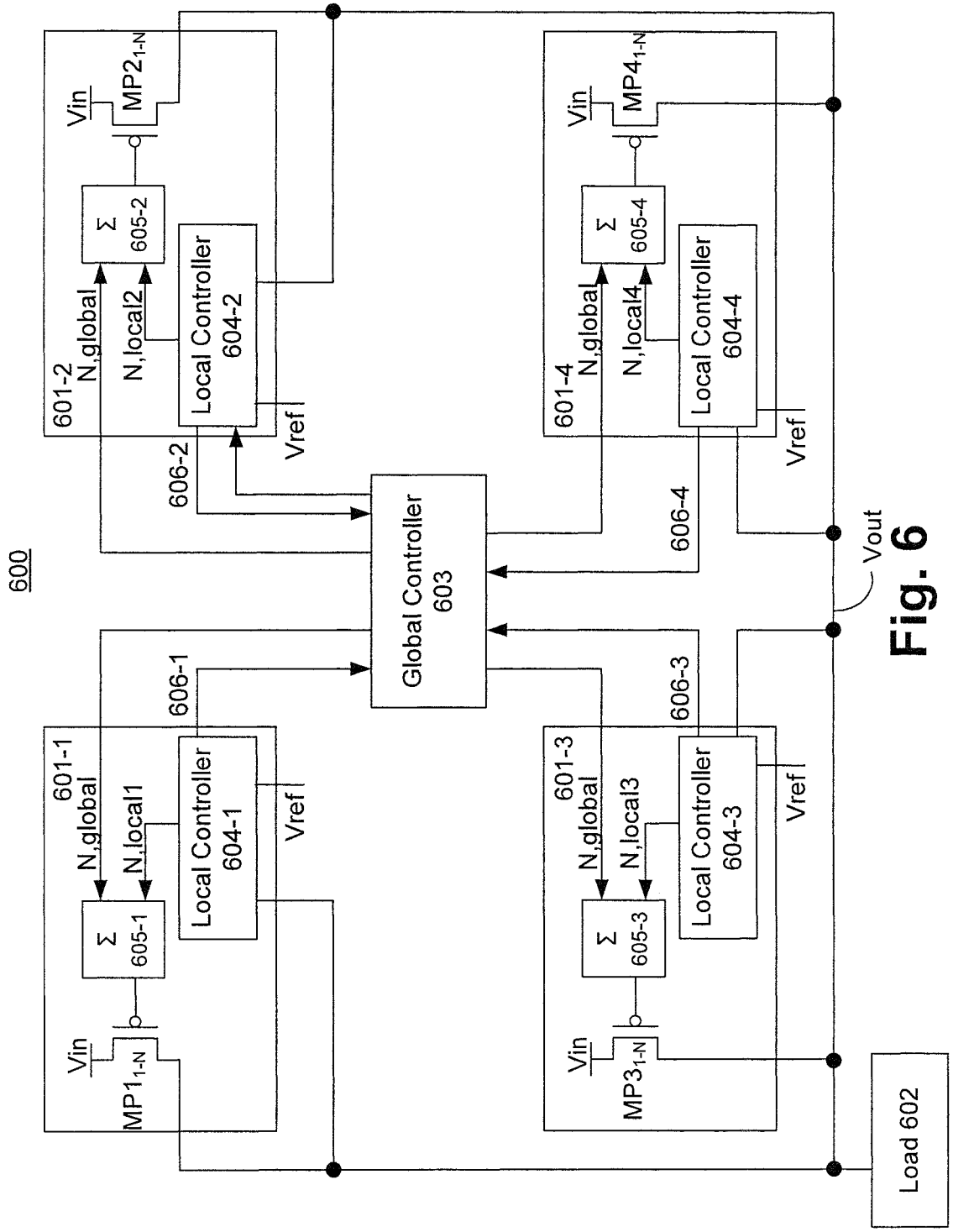
FIG. 6 is a distributed DLDO architecture with globally controlled current sharing, according to one embodiment of the disclosure.

FIG. 6 is a distributed DLDO VR architecture 600 with globally controlled current sharing, according to one embodiment of the disclosure. It is pointed out that those elements of FIG. 6 having the same reference numbers (or names) as the elements of any other figure can operate or function in any manner similar to that described, but are not limited to such.

The embodiment of FIG. 6 illustrates a distributable control scheme for multiple DLDO VRs supplying the same voltage domain. In this embodiment, distributable DLDO VR scheme, a global controller enforces current sharing between local DLDO VRs to avoid current crowding while maintaining stability and a fast droop response time (approximately in nanosecond range). The global controller synchronizes global current sharing by equalizing the number of switched on p-type power gates in each DLDO tile.

In one embodiment, distributed DLDO architecture 600 comprises a plurality of DLDO VRs (e.g., 601-1 to 601-N, where 'N' is an integer greater than one) to provide a regulated output power supply Vout (also called node Vout) to load 602. So as not to obscure the embodiments, N=4. In one embodiment, distributed DLDO architecture 600 comprises a global controller 603 to implement current sharing between DLDO VRs 601-1 to 601-4 to avoid current crowding as associated issues.

In one embodiment, DLDO VR 601-1 comprises a local controller 604-1, a summer 605-1, and a plurality of power gates $MP1_{1-N}$, where 'N' is an integer greater than one. In one embodiment, output of local controller 604-1 is N,local1. In one embodiment, gate terminal of the plurality of power gates $MP1_{1-N}$ is controlled by output N,total1 of summer 605-1. In one embodiment, source terminal of the plurality of power gates $MP1_{1-N}$ is coupled to input power supply Vin while the drain terminal of the plurality of power gates $MP1_{1-N}$ is coupled to output node Vout. In one embodiment, local controller 604-1 provides information to global controller regarding its comparison result (i.e., comparison of Vref with Vout) via signal 606-1. In one embodiment, global controller 603 provides N,global signal to summer 605-1. N,global signal is based on collective feedback from all local controllers.

In one embodiment, DLDO VR 601-2 comprises a local controller 604-2, a summer 605-2, and a plurality of power gates $MP2_{1-N}$, where 'N' is an integer greater than one. In one embodiment, output of local controller 604-2 is N,local2. In one embodiment, gate terminal of the plurality of power gates $MP2_{1-N}$ is controlled by output N,total2 of summer 605-2. In one embodiment, source terminal of the plurality of power gates $MP2_{1-N}$ is coupled to input power supply Vin while the drain terminal of the plurality of power gates $MP2_{1-N}$ is coupled to output node Vout. In one embodiment, local controller 604-2 provides information to global controller regarding its comparison result (i.e., comparison of Vref with Vout) via signal 606-2. In one embodiment, global controller 603 provides N,global signal to summer 605-2.

In one embodiment, DLDO VR 601-3 comprises a local controller 604-3, a summer 605-3, and a plurality of power gates $MP3_{1-N}$, where 'N' is an integer greater than one. In one embodiment, output of local controller 604-3 is N,local3. In one embodiment, gate terminal of the plurality of plurality of power gates $MP3_{1-N}$ is controlled by output of N,total3 summer 605-3. In one embodiment, source terminal of the plurality of power gates $MP3_{1-N}$ is coupled to input power supply Vin while the drain terminal of the plurality of power gates $MP3_{1-N}$ is coupled to output node Vout. In one embodiment, local controller 604-3 provides information to global controller regarding its comparison result (i.e., comparison of Vref with Vout) via signal 606-3. In one embodiment, global controller 603 provides N,global signal to summer 605-3.

In one embodiment, DLDO VR 601-4 comprises a local controller 604-4, a summer 605-4, and a plurality of power gates $MP4_{1-N}$, where 'N' is an integer greater than one. In one embodiment, output of local controller 604-4 is N,local4. In one embodiment, gate terminal of the plurality of power gates $MP4_{1-N}$ is controlled by output N,total4 of summer 605-4. In one embodiment, source terminal of the plurality of power gates $MP4_{1-N}$ is coupled to input power supply Vin while the drain terminal of the plurality of power gates $MP4_{1-N}$ is coupled to output node Vout. In one embodiment, local controller 604-4 provides information to global controller regarding its comparison result (i.e., comparison of Vref with Vout) via signal 606-4. In one embodiment, global controller 603 provides N,global signal to summer 605-4.

In one embodiment, total number of switched-on power-gates in each DLDO VR (N,total,i, for the i-th DLDO VR) is the summation of the following digital values: N,total,i=N,local,i+N,global. In one embodiment, each local DLDO controller monitors the local Vout and controls N,local,i in hysteretic mode for fast regulation (e.g. at 1 GHz clock), where N,local,i is either 0 or 1. The term "local Vout" refers to the voltage on node Vout which is physically close to the DLDO VR. In one embodiment, global controller 603 determines N,global based on the collective feedback from all local controllers at a lower frequency to accommodate the delay from global to local controllers (e.g. 125 MHz, depending on the voltage domain size). In one embodiment, by limiting the dynamic range of N,local,i, different levels of current sharing between DLDOs is achieved.

The following description discusses DLDO VR 601-1. The same explanation is applicable to other DLDO VRs. In one embodiment, local controller 604-1 which receives Vref and compares it with output voltage Vout to determine whether to turn on (i.e., count up) or turn off (i.e., to count down) number of active (i.e., turned on) transistors of $MP1_{1-N}$. In one embodiment, output of local controller 604-1 is N,local1, where N is either '1' or '0.' In this example, when N=1 for N,local1 it refers to local controller 604-1 determining that more transistors for $MP1_{1-N}$ need to be turned on (i.e., the counter of local controller 604-1 needs to count up). In one embodiment, local controllers 604-1 to 604-4 are clocked at a higher frequency than global controller 603 to allow fast local regulation bandwidth. By adjusting the dynamic range of the N,global and N,local1, the level of global current sharing can also be adjusted.

FIG. 7 is an example 700 illustrating the operation of the distributed DLDO architecture with globally controlled current sharing, according to one embodiment of the disclosure. It is pointed out that those elements of FIG. 7 having the same reference numbers (or names) as the elements of any other figure can operate or function in any manner similar to that described, but are not limited to such.

Example 700 shows a table with eight columns. In this example, two DLDO VRs (601-1 and 601-2) are considered. The same explanation applies to any number of DLDO VRs. Column 701 indicates cycle number of slow clock used by global controller 603. Column 702 indicates "N,global" which is determined by "N,local,1" and "N,local,2" of the two DLDO VRs 601-1 and 601-2 respectively. Column 703 indicates cycle number of fast clock which is used by local controllers of DLDO VRs 601-1 and 601-2. In this example, fast clock is four times faster than slow clock. Column 704 is the output "N,local,1" of local controller 604-1. Column 705 is the output "N,local,2" of local controller 604-2. Column 706 is the output "N,total,1" of summer 605-1 which is the sum of "N,global" and "N,local,1." Column 707 is the output "N,total,2" of summer 605-2 which is the sum of "N,global" and "N,local,2." Column 708 is the sum total "N,total" which is the sum of "N,total,1" and "N,total,2."

In this example, the desired Vout level (determined by load 602) is achieved by a total of 10.5 power stages. During the first four cycles of fast clock (as shown by first four rows of 703), both local controllers of DLDO VRs 601-1 and 601-2 demand that more power states be turned on because the current total number of power states is 2. In this example, box 709 indicates that both "N,local,1" and "N,local,2" are one at all times during the four clock cycles of fast clock. This indicates that DLDO VRs 601-1 and 601-2 demand that more power states be turned on to achieve the desired Vout level.

In this example, at cycle number 2 of slow clock (row number 5), each local controller 604-1 and 604-2 analyses the values of "N,local,1" and "N,local,2" within one slow clock cycle. If "N,local,i" is toggling (between 1 and 0 i.e., 'i' toggling between 1 and 0) then local controller 604-i does not request the global controller 603 to increment or decrement. If "N,local,i" has value 1 at all times during the four fast clock cycles then the corresponding local controller 604-I (where 'I' is 1 to 4 in this example) sends a signal to global controller 603 to demand for more active (i.e., turned on) transistors. If any of the local controllers 604-I requests more transistors in the previous slow clock cycle, "N,global" is incremented by 1. If "N,local,I" has value 0 at all times during the four fast clock cycles then the corresponding local controller 604-I sends a signal to global controller 603 to request reducing the number of active transistors. If all of the local controllers 604-I request to reduce the number of active transistors in the previous slow clock cycle then "N,global" is decremented by one. In other cases, "N,global" remains the same.

In this example, since "N,local,1" and "N,local,2" are both ones during a slow clock cycle (i.e., four fast clock cycles), "N,global" in 702 is incremented from zero to 1. The same is true for the next four slow clock cycles i.e., slow clock cycles 3, 4, 5, and 6 indicated by 710. During these slow clock cycles, "N,global" continues to increment by one and "N,total,1" and "N,total,2" continue to increment till "N,total" approaches 11, which is just above the target output number of turned on power stages of 10.5.

During four fast clock cycles (as shown by box 711) in clock cycle number 6, "N,local,1, toggles between 1 and 0 as N,total toggles above and below the target number of power stages (in this example, 10.5 power stages). In this example, "N,local,2" remains zero during these fast clock cycles because the local Vout is higher than Vref and so the counter (in local controller 604-1) of DLDO VR 601-2 is indicating lowering of the number of turned on power stages of DLDO VR 601-2. Since "N,local,1" is toggling between 1 and 0, "N,global" remains the same at 5 as indicated by slow clock cycles 6 and 7. During this time, "N,total" toggles between 10 and 11 which is a steady state condition for the distributed DLDO network.

In this example, "N,global" increments by 1. In other embodiments, "N,global" and "N,local" may have different count step sizes. In one embodiment, "N,global" count step size is less than or equal to "N,local" count step size divided by number of local DLDO VRs to improve the stability of the global control loop.

FIG. 8 is another example 800 illustrating the operation of the distributed DLDO architecture with globally controlled current sharing, according to one embodiment of the disclosure. It is pointed out that those elements of FIG. 8 having the same reference numbers (or names) as the elements of any other figure can operate or function in any manner similar to that described, but are not limited to such.

Example 800 has a table similar to the table of example 700. In this case, column 801 is the same as column 701, column 802 is the same as column 702, column 803 is the same as column 703, column 804 is the same as column 704, column 805 is the same as column 705, column 806 is the same as column 706, column 807 is the same as column 707, and column 808 is the same as column 708.

In this example, load 602 demands a total of 10.2 power stages and the step size of the counter that generates "N,global" is different from the step size of the counter that generates "N,local,1" and "N,local,2." In this example, step size of the counter that generates "N,global" is 0.25 while the step size of counter that generates "N,local,1" and "N,local,2" is 1 (like in example 700). During the first five slow clock cycles, "N,local,1" and "N,local,2" remain at 1 indicating that more power stages in each of the DLDO VR 601-1 and 601-2 need to turn on to achieve the target of 10.2 power stages. This is indicated by box 809. So, "N,global" increments by 0.25 (every slow clock cycle) till "N,global" reaches 4.25 because "N,local,1" and "N,local,2" being 1 for every slow clock cycle from slow clock cycle 1 to 5. This is indicated by 810. During slow clock cycle 6, "N,local,2" remains a 1 but "N,local,1" toggles between 1 and 0. This is because, DLDO VR 601-2 determines that its local Vout is still below Vref while DLDO VR 601-1 determines that it is in steady state. In one embodiment, when any of the "N,locals" keeps high, "N,global" is still incremented. In this example, "N,local2," is 1 (shown by 811) and so "N,global" increments from slow clock cycle 6 to 7 as shown by 812. Thereafter, "N,global" remains the same because "N,local, 1" and "N,local,2" are not ones all the time.

FIG. 9 is another example 900 illustrating the operation of the distributed DLDO architecture with globally controlled current sharing, according to one embodiment of the disclosure. It is pointed out that those elements of FIG. 9 having the same reference numbers (or names) as the elements of any other figure can operate or function in any manner similar to that described, but are not limited to such.

Example 900 has a table similar to the table of example 700. In this case, column 901 is the same as column 701, column 902 is the same as column 702, column 903 is the same as column 703, column 904 is the same as column 704, column 905 is the same as column 705, column 906 is the same as column 706, column 907 is the same as column 707, and column 908 is the same as column 708.

In this example, load 602 demands a total of 3.6 power stages and the step size of the counter that generates "N,global" is equal to the step size of the counter that generates "N,local,1" and "N,local,2" i.e., 0.25. In this example, the initial "N,total" is 5 which is above the target of 3.6. During the first three slow clock cycles, "N,local,1" and "N,local,2" are a zero (as shown by block 909) indicating that more power stages need to turn off to bring down Vout voltage level. When all "N,locals" are zero for a slow clock cycle, "N,global" is decremented by its step size. In this example, "N,global" decrements from 2.5 to 2. This is shown by 910. The remaining operation of example 900 is self explanatory based on the examples of example 700 and 800.

Figure 10:
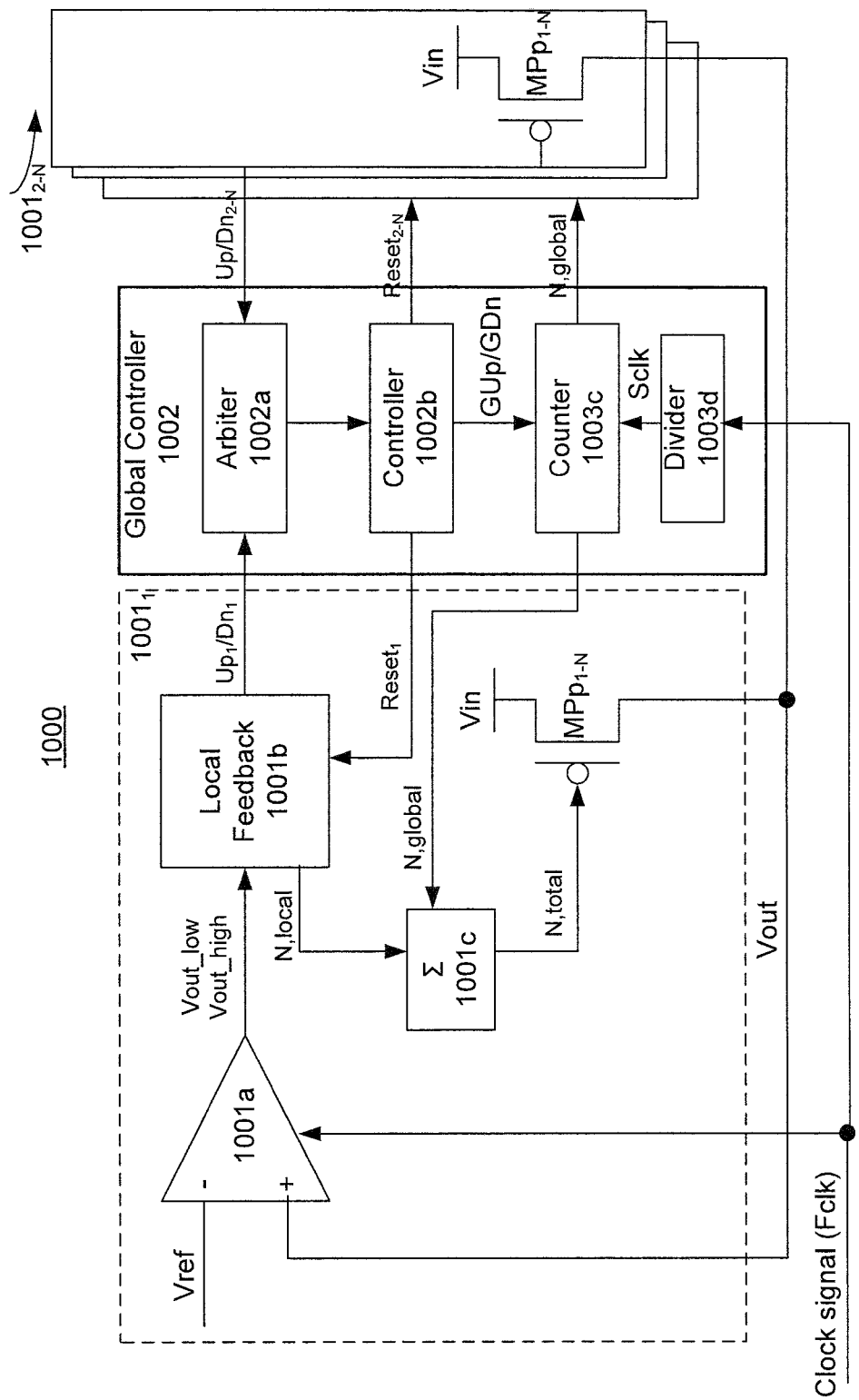
FIG. 10 is a distributable DLDO architecture, according to one embodiment of the disclosure.

FIG. 10 is a distributable DLDO architecture 1000, according to one embodiment of the disclosure. It is pointed out that those elements of FIG. 10 having the same reference numbers (or names) as the elements of any other figure can operate or function in any manner similar to that described, but are not limited to such.

In one embodiment, in each DLDO VR tile, a local latched comparator clocked by the fast clock (Fclk) compares the local output voltage Vout to Vref. In one embodiment, the comparison result,"Vout_low" and "Vout_high," (from local latched comparator e.g., 1001a) are fed to a Local Feedback block 1001b, whose output "N,local" controls the local power gates via a digital summation circuit 1001c. In one embodiment, the other input to the digital summation circuit (also called summer) is "N,global" from a global Up/Down counter shared by all DLDO VR tiles. In one embodiment, a global counter (e.g., 1003c) of global controller (e.g., 1002) is clocked by a divided clock (e.g. from 1003d), Sclk (slow clock signal), at a lower frequency, so that "N,global" can be properly distributed across all DLDO VR tiles within one slow clock cycle. In one embodiment, the global controller seeks the optimal "N,global" value by counting up or down depending on the feedback from all tiles. In one embodiment, the up-or-down decision is obtained in two levels, local and global, at the slow clock frequency.

In this example, DLDO VR $1001_1$ (e.g., 601-1) is shown in detail. The same discussion is applicable to other DLDO VRs $1001_{2-N}$ (e.g., 601-2 to 601-N), where 'N' is an integer greater than 2. In one embodiment, DLDO VR $1001_1$ comprises a comparator 1001a that compares Vout to Vref and generates "Vout_high" and "Vout_low." "Vout_high" is logic high when Vout>Vref, and "Vout_low" is logic high when Vout<Vref. In one embodiment, DLDO VR $1001_1$ comprises a Local Feedback 1001b which receives "Vout_high" and "Vout_low" and generates "N,local" for the summer 1001c and local Up and Dn (down) signals for global controller 1002. In one embodiment, Local Feedback 1001b receives Reset signal ($Reset_1$) from global controller 1002.

Figure 14A:
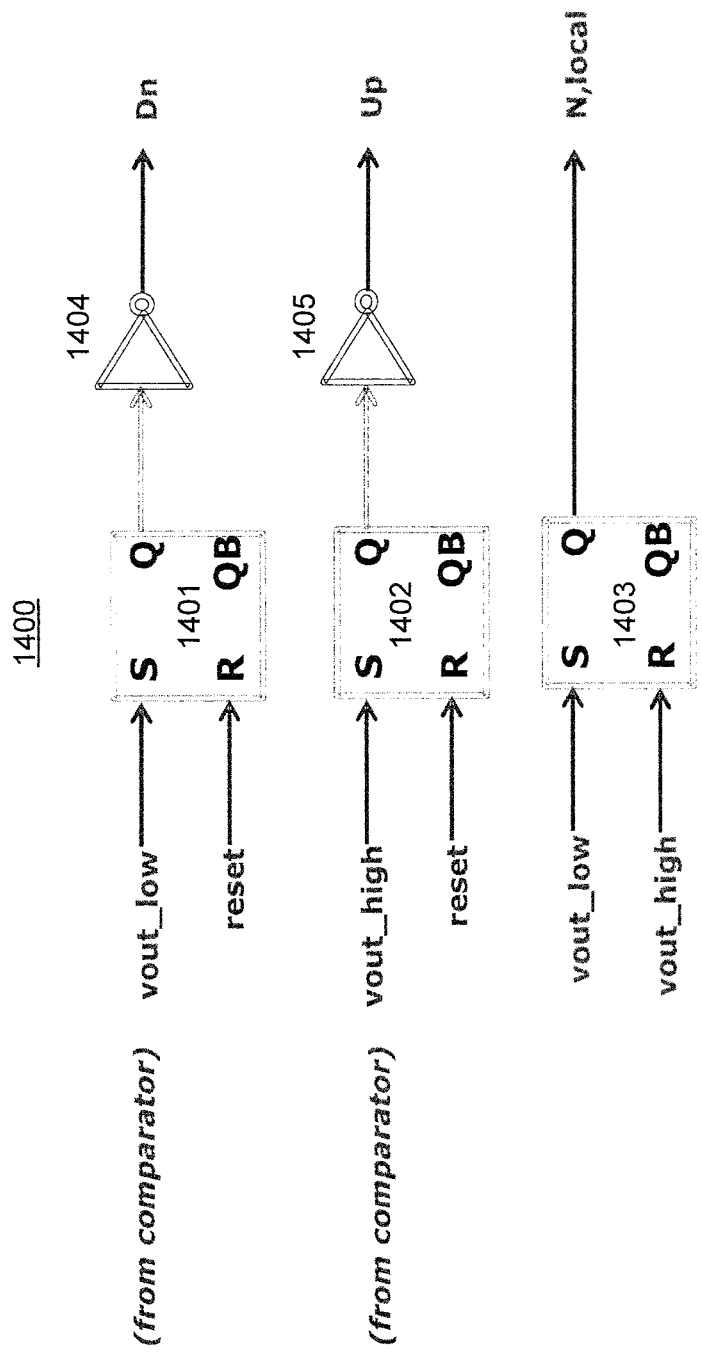
FIGS. 14A-B are logic blocks of a local controller of the distributable DLDO architecture, according to one embodiment of the disclosure.

FIG. 14A are logic units of local feedback 1001b of the distributable DLDO VR $1001_1$, according to one embodiment of the disclosure. It is pointed out that those elements of FIG. 14A having the same reference numbers (or names) as the elements of any other figure can operate or function in any manner similar to that described, but are not limited to such. In one embodiment, local feedback 1001b comprises sequential units which are resettable. In one embodiment, output of comparator 1001a is latched to generate $Up_1$ and $Dn_1$ signals for global controller 1002. In one embodiment, Local Feedback 1001b comprises set-reset (SR) latches 1401, 1402, and 1403, and inverters 1404 and 1405.

In one embodiment, reset signal is received from global controller 1002 to reset $Up_1$ and $Dn_1$ signals to logic high. In one embodiment, $Dn_1$ signal is set to logic low when Vout_low is logic high. In one embodiment, $Up_1$ signal is set to logic low when Vout_high is logic high. In such an embodiment, $Up_1$ signal remains high after a slow clock period only when Vout_high remains low. In this embodiment, $Dn_1$ signal remains high after a slow clock only when Vout_low remains low. In one embodiment, the signals Vout_low and Vout_high are used to set and reset SR-latch 1403, whose output N,local feeds summer 1001c.

Referring back to FIG. 10, in one embodiment, DLDO VR $1001_1$ comprises summer 1001c which sums "N,local" with "N,global" to generate "N,total," where "N,total" is used to turn on or off transistors of $MPp_{1-N}$. In one embodiment, summer 1001c is implemented as a carry look-ahead adder. In other embodiments, other implementations of summer 1001c may be used. $MPp_{1-N}$ are the power gates that are coupled to Vin and Vout and regulate local Vout (local to DLDO VR $1000_1$). Each DLDO VR has power gates $MPp_{1-N}$.

In one embodiment, Global Controller 1002 comprises Arbiter 1002a that receives Up and Dn signals from all DLDO VRs. For example, Arbiter 1002a receives $Up_1$ and $Dn_1$ from DLDO VR $1001_1$ and $Up_{2-N}$ and $Dn_{2-N}$ from DLDO VRs $1001_{2-N}$. In one embodiment, output of Arbiter 1002a is received by Controller 1002b which generates global up and down signals—GUp and GDn—signals for global Counter 1003c.

FIG. 13A is a circuit 1300 for generating GUp and GDn signals, according to one embodiment of the disclosure. It is pointed out that those elements of FIG. 13A having the same reference numbers (or names) as the elements of any other figure can operate or function in any manner similar to that described, but are not limited to such. In one embodiment, circuit 1300 comprises an OR logic gate 1301 and an AND logic gate 1302.

In one embodiment, OR logic gate 1301 performs OR function on all Up signals from Local Feedback units to determine GUp. As discussed with reference to FIG. 8, when the "N,locals" of any of the local DLDOs remains one (which indicate that the Up signal for that DLDO VR is a one) during previous slow clock cycle, global controller increments "N,global." In one embodiment, this OR function in FIG. 8 is performed by OR logic gate 1301.

Referring back to FIG. 13A, in one embodiment, AND logic gate 1302 performs an AND operation on all down signals i.e., $Dn_{1-N}$ to generated global down signal GDn. As discussed with reference to FIG. 9, when all "N,locals" from all DLDO VRs are zero during a slow clock cycle, then global controller decrements "N,global." This function is performed by AND logic gate 1302.

Referring back to FIG. 10, in one embodiment, Controller 1002b generates reset signals for Local Feedback units of DLDO VRs. For example, Controller 1002b generates $Reset_1$ for Local Feedback 1001b of DLDO VR $1001_1$, and generates $Reset_{2-N}$ for DLDO VRs $1001_{2-N}$ to reset respective Up and Dn signals generated by respective Local Feedback units. FIG. 13B is an Edge to Pulse Generator 1320 which generates a reset signal as pulse signal. In one embodiment, Edge to Pulse Generator 1320 receives slow clock signal (Sclk) and fast clock signal (Fclk) to generate reset pulse. This reset pulse corresponds to $Reset_{1-N}$. In one embodiment, the reset signal goes high when Sclk goes high. In one embodiment, the duration of the reset signal is controlled by delay elements (e.g. inverter delay) inside edge to pulse generator 1320. In one embodiment, the duration of the reset signal is controlled by counting the number of Fclk cycles (e.g., 2 clock cycles). FIG. 13C are waveforms 1330 showing an exemplary relationship between Sclk and Reset pulse generated by Edge to Pulse Generator 1320. In this example, the pulse width of Reset pulse is as wide as multiples of an Fclk cycle. In one embodiment, the Reset pulse originates at the rising edge of Sclk.

Referring back to FIG. 10, in one embodiment, Counter 1003c is an up and down counter which counts or updates every Sclk cycle (of slow clock signal). In one embodiment, Global Controller 1002 comprises Divider 1003d which receives Clock signal (fast clock signal (Fclk)) and divided it down to Sclk (of slow clock signal). In one embodiment, Divider 1003d is operable to divide Clock signal by 1, 2, 4, 8, etc. In one embodiment, output of Counter 1003c is "N,global" which is provided to all DLDO VRs. In one embodiment, "N,global" is received by respective summers to generate "N,total."

Figure 11:
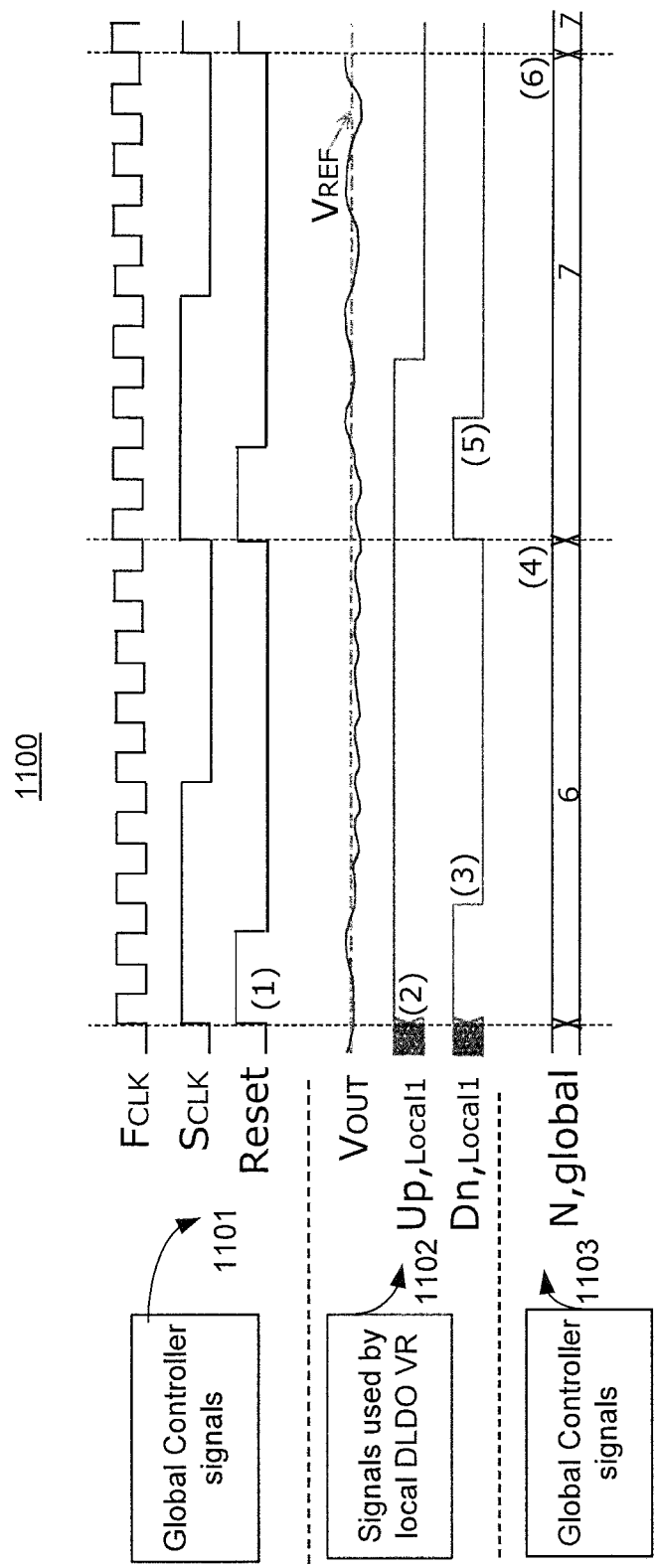
FIG. 11 is a timing diagram of a distributable DLDO architecture with globally controlled current sharing, according to one embodiment of the disclosure.

FIG. 11 is a timing diagram 1100 of a distributable DLDO architecture with globally controlled current sharing, according to one embodiment of the disclosure. It is pointed out that those elements of FIG. 11 having the same reference numbers (or names) as the elements of any other figure can operate or function in any manner similar to that described, but are not limited to such.

For simplicity, only one local DLDO VR and global controller signals are shown in this figure. The waveforms are grouped in three groups. The first group is 1101 which are signals associated with global controller (e.g., 1002). The second group is 1102 which are signals associated with local controller (e.g., part of 1001$_1$). The third group is 1103 which are signals associated with global controller (e.g., 1002). The dashed waveforms represent delayed versions of their solid-line counterparts due to the distance between the local and the global controllers.

At indicator (1), at the rising edge of Sclk, a reset pulse (e.g., Reset) is generated by global controller 1002, which feeds to local control (e.g., Local Feedback 1001b). At indicator (2), the local Up and Dn signals (e.g., Up$_1$ and Dn$_1$) are reset to high states until the "Reset" signal goes low. At indicator (3), if the local comparator (e.g., 1001a) detects that Vout<Vref, then Dn,local1 signal goes low. With reference to FIGS. 7-10, "Dn,local1" is same as Dn$_1$. At indicator (4), at the Sclk rising edge, Global Counter 1003c counts up if any of the "Up,local" signals are high. In this case, GUp is asserted. At indicator (5), if the comparator (e.g., 1001a) detects that Vout>Vref, then "Up,local1" signal goes low. With reference to FIGS. 7-10, "Un,local1" is same as Up$_1$. At indicator (6), at the Sclk rising edge, if none of the "Up,locals" (from all DLDO VRs) are high and not all of the "Dn,local" (from all of DLDO VR) signals are high, Global Counter 1003c remains at the same count value. In other words, Arbiter 1002a performs an "OR" operation on all the Up,local signals from the DLDO VRs, and an "AND" operation on all the "Dn,local" signals from the DLDO VRs.

The OR operation for the "Up,local" signals and the AND operation for the Dn,local signals guarantees that all the DLDO VRs have their local Vouts above Vref when steady state is reached. In one embodiment, the two-level decision mechanism discussed above allows for fast-switching signals to run locally (at higher frequencies) while the global signals are run at a lower frequency. In one embodiment, Global Controller 1002 runs at a lower frequency than local controllers of each DLDO VR. In such an embodiment, Global Controller 1002 can used for different voltage domain sizes and different number of DLDO VR tiles because the Global Controller 1002 can run at a lower frequency. Lower frequency operation of Global Controller 1002 allows it to be used for large voltage domain size or large number of local DLDO VRs without sacrificing response time of local DLDO VRs. In one embodiment, the Sclk frequency can be reduced to allow sufficient settling time to accommodate the signals delays.

Figure 12:
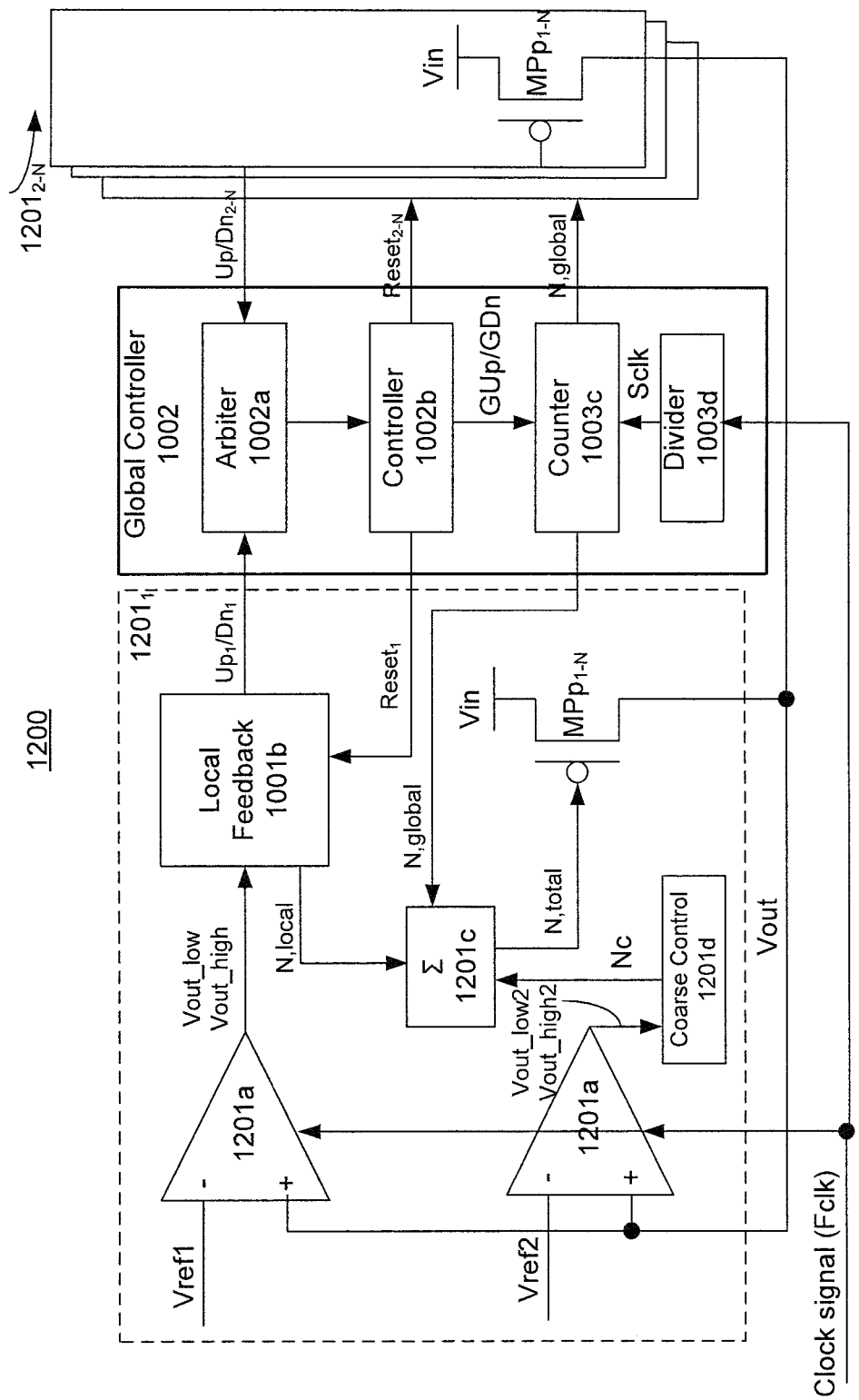
FIG. 12 is a distributable DLDO architecture with coarse control, according to one embodiment of the disclosure.

FIG. 12 is a distributable DLDO architecture 1200 with coarse control, according to one embodiment of the disclosure. It is pointed out that those elements of FIG. 12 having the same reference numbers (or names) as the elements of any other figure can operate or function in any manner similar to that described, but are not limited to such.

The embodiment of FIG. 12 is similar to the embodiment of FIG. 10 except that the DLDO VRs 1201$_{1-N}$ have dual-loop architecture as discussed with reference to FIGS. 1-5. So as not to obscure the embodiments, differences between FIG. 10 and FIG. 12 are discussed.

In one embodiment, DLDO VR 1201$_1$ comprises a first comparator 1201$a_1$ that compares Vout with a first reference Vref1. The output of first comparator 1201$a_1$ is "Vout_low" and "Vout_high." In one embodiment, DLDO VR 1201$_1$ comprises a second comparator 1201$a_2$ that compares Vout with a second reference Vref2. In one embodiment, Vref1 is different from Vref2. In one embodiment, Vref2=Vref1−ΔV. In such an embodiment, second comparator 1201$a_2$ is used for identifying voltage droop on Vout. The output of first comparator 1201$a_2$ is "Vout_low2" and "Vout_high2." In one embodiment, both first and second comparators 1201$a_1$ and 1201$a_2$ are clocked comparators.

In one embodiment, second clocked-comparator 1201$a_2$ with a slightly lower threshold voltage (Vref1−ΔV) is used to detect large droop events on Vout. When a large droop event happens on Vout, the coarse mode kicks in for a quick local droop recovery by turning on more local power gates MPp$_{1-N}$ per clock cycle. In one embodiment, output "Vout_low2" and "Vout_high2" of second clocked-comparator 1201$a_2$ is received by Coarse Control unit 1201d. In one embodiment, Coarse Control unit 1201d comprises an Up/Down counter. In one embodiment, the Up/Down counter increments every Fclk cycle when Vout_low2 is high, and decrements when Vout_low2 is low. In one embodiment, to accommodate a wide range of di/dt load steps, the output "Nc" of Coarse Control unit 1201d is increased adaptively on demand using a counter when Vout<Vref1−ΔV. In one embodiment, the separation of the threshold voltages of the coarse/fine comparators (where fine comparator is first comparator 1201$a_1$ and coarse comparator is second comparator 1201$a_2$) avoids triggering the coarse turn on and off of MPp$_{1-N}$ in steady load condition where the local fine and the global controller are in charge. In one embodiment, ΔV=20 mV. In other embodiments, other values of ΔV may be used. In one embodiment, summer 1201c generates "N,total" to control MPp$_{1-N}$ by adding "N,local," "Nc," and "N,global."

Figure 14B:
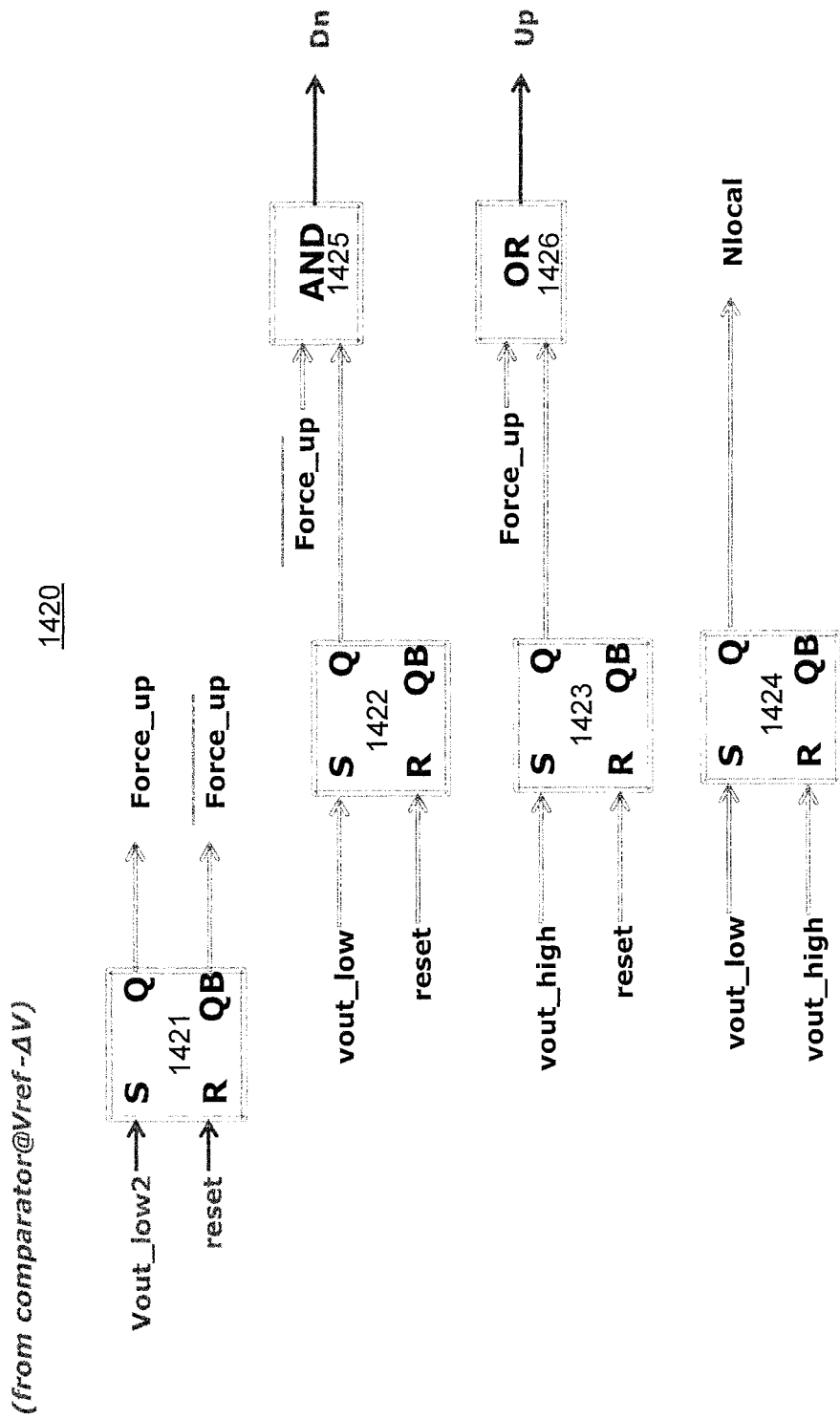

FIG. 14B are logic units of local feedback 1001b of the distributable DLDO VR 1201$_1$, according to one embodiment of the disclosure. It is pointed out that those elements of FIG. 14B having the same reference numbers (or names) as the elements of any other figure can operate or function in any manner similar to that described, but are not limited to such. In one embodiment, local feedback 1001b comprises sequential units which are resettable. In one embodiment, output signal "Vout_low2" of second comparator 1201$a_2$ is latched to generate Force_up and its complementary signal $\overline{\text{Force\_up}}$. In one embodiment, Local Feedback 1001*b* comprises set-reset (SR) latches 1421, 1422, 1423, 1424, AND gate 1425, and OR gate 1426. In one embodiment, reset signal is received from global controller 1002 to reset the SR latches 1421, 1422, 1423, and 1424. The operation of SR latches 1421, 1422, 1423, 1424 are similar to those in FIG. 14A. In one embodiment, when Vout_low2 is high, indicating Vout<Vref−ΔV, Force_up signal is set to high and the Up signal is thus high. Likewise, when Force_up signal is low, the Dn signal is low. In this case, when the course mode of any of the local DLDO VR is kicked in, Global Counter 1003*c* increments in the next Sclk cycle.

Figure 15:
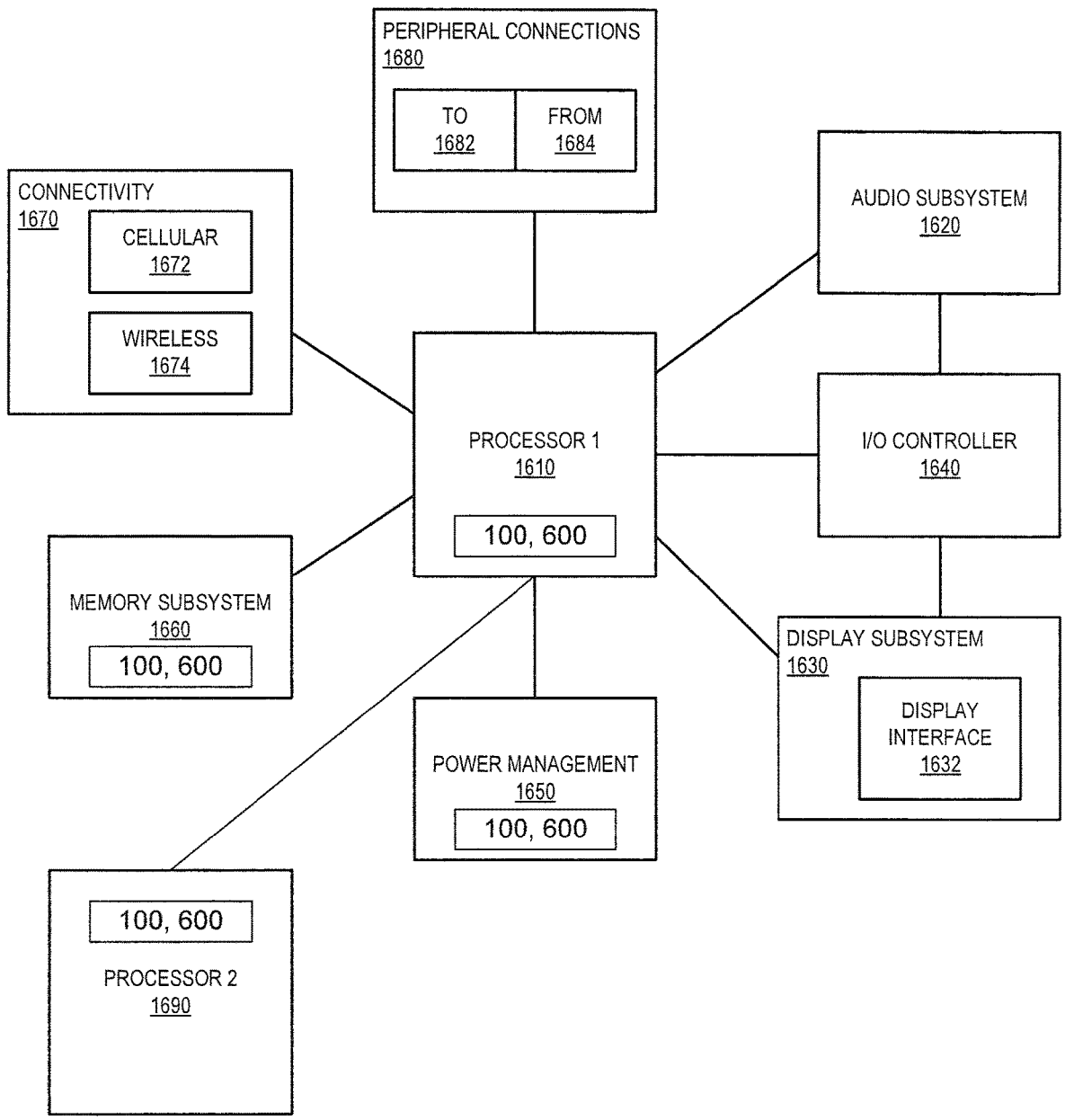
FIG. 15 is a smart device or a computer system or an SOC (system on chip) with at least one of dual-loop DLDO VR and the distributed DLDO architecture with globally controlled current sharing, according to one embodiment of the disclosure.

FIG. 15 is a smart device or a computer system 1600 or an SOC (system on chip) with at least one of dual-loop DLDO VR and the distributed DLDO architecture with globally controlled current sharing, according to one embodiment of the disclosure. It is pointed out that those elements of FIG. 15 having the same reference numbers (or names) as the elements of any other figure can operate or function in any manner similar to that described, but are not limited to such.

FIG. 15 is a block diagram of an embodiment of a mobile device 1600 (also called computing device) in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 and/or second processor 1690 with at least one of dual-loop DLDO VR and the distributed DLDO architecture with globally controlled current sharing, according to the embodiments discussed. Other blocks of the computing device 1600 may also include at least one of dual-loop DLDO VR and the distributed DLDO architecture with globally controlled current sharing. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device 1600. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus comprising: a plurality of transistors coupled to an input power supply and to a load; a first comparator with a first node coupled to the load, and a second node coupled to a first reference; a second comparator with a first node coupled to the load, and a second node coupled to a second reference, the second reference being different from the first reference; and a logic unit to receive output of the first comparator and output of the second comparator, the logic unit to turn on or off transistors of the plurality of transistors according to outputs of the first and second comparators.

In one embodiment, the first and second comparators to receive a first clock signal and a second clock signal respectively. In one embodiment, the first clock signal is slower or equal in frequency than the second clock signal. In one embodiment, the apparatus further comprises a divider to divide frequency of the second clock signal to generate the first clock signal.

In one embodiment, the apparatus further comprises a first counter to turn on or off transistors from the plurality of transistors according to an output of the first comparator. In one embodiment, the apparatus further comprises a second counter to turn on or off transistors from the plurality of transistors according to an output of the second comparator. In one embodiment, the number of the plurality of transistors controlled per count step of the second counter is different than the number of the plurality of transistors controlled per count step of the first counter. In one embodiment, the apparatus further comprises an adder coupled to the first and second counters. In one embodiment, the adder is controllable by the logic unit. In one embodiment, output of the adder controls gate terminals of the plurality of transistors.

In one embodiment, the plurality of transistors are grouped as first and second sets of transistors, wherein in the first set of transistors is controlled by output of the first comparator, and wherein the second set of transistors is controlled by output of the second comparator. In one embodiment, the first set of transistors operate during steady state while the second set of transistor operate during a voltage overshoot or voltage undershoot on a node coupled to the load.

In one embodiment, the apparatus further comprises a counter coupled to the logic unit, the output of the counter for controlling gate terminals of the plurality of transistors. In one embodiment, the counter to count up or down according to output of the first and second comparators, and wherein count step size of count up is different or same from count step size of count down.

In another example, a voltage regulator comprises: a first set of plurality of transistors coupled to an input power supply and an output node, the output node coupled to a load; a second set of plurality of transistors coupled to the input power supply and the output node; a first comparator with a first node coupled to the output node, and a second node coupled to a first reference; a second comparator with a first node coupled to the output node, and a second node coupled to a second reference, the second reference being different from the first reference; and a logic unit to receive output of the first comparator and output of the second comparator, the logic unit to generate an output for controlling gate terminals of the first and second sets of plurality of transistors according to outputs of the first and second comparators.

In one embodiment, the voltage regulator further comprises a divider coupled to the first and second comparators. In one embodiment, the first and second comparators are clocked comparators by clock signals of different frequencies. In one embodiment, the first and second comparators are clocked comparators by clock signals of same frequencies during a voltage droop event on the output node.

In another example, a system comprises: a memory unit; a processor coupled to the memory unit, the processor having a voltage regulator to provide power supply to logic units of the processor, the voltage regulator including: a plurality of transistors coupled to an input power supply and to a load; a first comparator with a first node coupled to the load, and a second node coupled to a first reference; a second comparator with a first node coupled to the load, and a second node coupled to a second reference, the second reference being different from the first reference; and a logic unit to receive output of the first comparator and output of the second comparator, the logic unit to turn on or off transistors of the plurality of transistors according to outputs of the first and second comparators; and a wireless interface for allowing the processor to communicate with another device.

In one embodiment, the plurality of transistors are grouped as a first and second sets of transistors, wherein in the first set of transistors is controlled by output of the first comparator, and wherein the second set of transistors is controlled by output of the second comparator. In one embodiment, the system further comprises a counter coupled to the logic unit, the output of the counter for controlling gate terminals of the plurality of transistors.

In another example, a processor comprises: a plurality DLDO VRs, each of which includes a local controller to compare an output voltage provided to a load against a reference voltage, the local controller to generate an output indicating whether transistor from a plurality of transistors of a DLDO VR should be turned on or off, the plurality of transistors coupled to an input power supply and a node having the output voltage; and a global controller coupled to each of the DLDO VR, the global controller to generate an output according to outputs of the local controllers, wherein each of the DLDO includes an adder to add outputs of the local controller and the global controller to generate an output for controlling gate terminals of the plurality of transistors.

In one embodiment, the global controller is operable to count up or down when any of the local controllers indicates the global controller to count up or when all of the local controllers indicates the global controller to count down. In one embodiment, the global controller is operable to maintain its output with a previous value when none of the local controllers indicates the global controller to count up and when not all of the local controllers indicate the global controller to count down.

In one embodiment, each DLDO VR comprises: a first comparator with a first node coupled to the load, and a second node coupled to a first reference; a second comparator with a first node coupled to the load, and a second node coupled to a second reference, the second reference being different from the first reference; and a logic unit to receive output of the first comparator and output of the second comparator, the logic unit for turning on or off transistors of the plurality of transistors according to outputs of the first and second comparators.

In one embodiment, the first and second comparators are clocked comparators. In one embodiment, the first comparator is clocked by a clock signal which is slower or equal in frequency than a clock signal received by the second comparator. In one embodiment, each DLDO VR comprises: a clocked comparator with a first node coupled to the load, and second node coupled to a reference; and a sequential logic unit coupled to output of the clock comparator, the output of the sequential logic unit to provide information to the global controller.

In one embodiment, the global controller comprises: a logic unit for receiving outputs of each of the local controllers; and a counter for generating the output of the global controller, the counter operable to count according to a clock signal having a different frequency from a clock signal received by the clocked comparator. In one embodiment, the counter of the global controller operates at a lower or equal frequency than the sequential unit of the local controller. In one embodiment, the plurality of DLDO VRs provides power supply to a continuous power grid. In one embodiment, wherein the local controller operates on a clock signal having a frequency different from a clock signal received by the global controller.

In another example, an integrated circuit (IC) comprises: an input node to provide an input power supply; a load coupled to an output node; a first DLDO VR including: a plurality of transistors coupled to the input node and the output node; a local controller to compare an output voltage of the output node against a reference voltage, the local controller to generate an output; and a global controller coupled to the first DLDO VR, the global controller to generate an output according to the output of the local controllers, wherein the first DLDO VR includes an adder to add output of the local controller and the global controller to generate an output for controlling gate terminals of the plurality of transistors.

In one embodiment, the output of the local controller to indicate whether transistor from the plurality of transistors should be turned on or off. In one embodiment, the IC further comprises a second DLDO VR including: a plurality of transistors coupled to the input node and the output node; a local controller to compare an output voltage of the output node against a reference voltage, the local controller to generate an output. In one embodiment, the global controller to receive the output of the local controller of the second DLDO VR. In one embodiment, the global controller is operable to count up or down when any of the local controllers indicates the global controller to count up or when all of the local controllers indicate the global controller to count down.

In one embodiment, the global controller is operable to maintain its output with a previous value when none of the local controllers indicate the global controller to count up and when not all of the local controllers indicate the global controller to count down. In one embodiment, the local controller operates on a clock signal having a frequency different from a clock signal received by the global controller.

In another example, system comprises: a memory unit; a processor coupled to the memory unit, the processor including: a plurality of DLDO VRs, each of which includes a local controller to compare an output voltage provided to a load against a reference voltage, the local controller to generate an output indicating whether transistor from a plurality of transistors of a DLDO VR should be turned on or off, the plurality of transistors coupled to an input power supply and an node having the output voltage; and a global controller coupled to each of the DLDO VR, the global controller to generate an output according to outputs of the local controllers, wherein each of the DLDO VR includes an adder to add outputs of the local controller and the global controller to generate an output for controlling gate terminals of the plurality of transistors; and a wireless interface for allowing the processor to communicate with another device.

In one embodiment, the global controller is operable to: count up or down when any of the local controllers indicates the global controller to count up or when all of the local controllers indicates the global controller to count down; and maintain its output with a previous value when none of the local controllers indicate the global controller to count up and when not all of the local controllers indicate the global controller to count down.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
a first plurality of power drivers and a second plurality of power drivers coupled to a load to supply an output voltage to the load; and
a controller coupled to the first and second pluralities of power drivers, wherein the controller is to implement a first loop to provide fine control bits to the first plurality of power drivers according to a difference between a first reference voltage and the output voltage, and to implement a second loop to provide coarse control bits to the second plurality of power drivers according to a difference between a second reference voltage and the output voltage, wherein the fine control bits indicate a number of power drivers to turn on among the first plurality of power drivers, the coarse control bits indicate a number of power drivers to turn on among the second plurality of power drivers, and a current step size of the coarse control bits is greater than a current step size of the fine control bits.

2. The apparatus of claim 1, wherein a sampling clock of the second loop is faster than a sampling clock of the first loop.

3. The apparatus of claim 1, wherein the controller is to:
determine whether there is a voltage droop in the output voltage based on the difference between the first reference voltage and the output voltage, and the difference between the second reference voltage and the output voltage;
adjust the fine control bits but not the coarse control bits in response to determining the voltage droop is not detected; and
adjust the coarse control bits in response to determining the voltage droop is detected.

4. The apparatus of claim 1, wherein the first and second pluralities of power drivers are partitioned such that they are positioned above and below the load.

5. The apparatus of claim 1, wherein power drivers of the first plurality of power drivers are smaller than power drivers of the second plurality of power drivers.

6. The apparatus of claim 1, wherein the first loop includes a first circuitry which operates on a first clock, the second loop includes a second circuitry which operates on a second clock, and a frequency of the second clock is higher than a frequency of the first clock.

7. The apparatus of claim 6, wherein the frequency of the first clock is increased when the second loop operates to mitigate a voltage droop in the output voltage.

8. The apparatus of claim 1, wherein the first loop and the second loop operate simultaneously.

9. The apparatus of claim 1, wherein the first loop is to operate in steady-state condition of the apparatus, and wherein the second loop is to operate in a non-steady-state condition.

10. The apparatus of claim 1, wherein the second reference voltage is lower than the first reference voltage.

11. The apparatus of claim 1, wherein the second reference voltage is lower than the first reference voltage by about 20 mV or larger.

12. The apparatus of claim 1, wherein:
the controller further comprises a first counter which outputs the fine control bits, a second counter which outputs the coarse control bits, and a logic unit coupled to the first counter and the second counter; and
the logic unit is to send a first signal to the first counter to generate the fine control bits and a second signal to the second counter to generate the coarse control bits.

13. The apparatus of claim 12, wherein:
the controller comprises a first comparator to compare the first reference voltage and the output voltage, and a second comparator to compare the second reference voltage and the output voltage; and
the logic unit is to send the first signal in response to a voltage output from the first comparator and to send the second signal in response to a voltage output from the second comparator.

14. An apparatus, comprising:
a first set of power drivers to provide a first power supply to a load;
a second set of power drivers to provide a second power supply to the load; and
a circuit to provide a first loop to control a number of power drivers which are turned on among the first set of power drivers, and a second loop to control a number of power drivers which are turned on among the second set of power drivers, wherein:
when a voltage of the load is in a steady state condition, the first loop is to control the number of power drivers which are turned on among the first set of power drivers, while the second loop does not control the number of power drivers which are turned on among the second set of power drivers; and
when there is a droop in the voltage of the load, the second loop controls the number of power drivers which are turned on among the second set of power drivers to resolve the droop.

15. The apparatus of claim 14, wherein the second loop adjusts the second power supply faster than the first loop adjusts the first power supply.

16. The apparatus of claim 14, wherein:
the circuit comprises a logic unit;
the first loop comprises a first comparator which is to compare the voltage of the load to a first reference voltage and provide a respective output to the logic unit;
the second loop comprises a second comparator which is to compare the voltage of the load to a second reference voltage and provide a respective output to the logic unit;
the logic unit is to control the number of power drivers which are turned on among the first set of power drivers in response to the respective output of the first comparator; and
the logic unit is to control the number of power drivers which are turned on among the second set of power drivers in response to the respective output of the second comparator.

17. A system-on-chip, comprising:
a first set of N p-type devices coupled to a load to provide current to the load;
a second set of M p-type devices coupled to the load to provide current to the load, wherein N and M are integers;
a fine-grain counter coupled to the first set of N p-type devices to provide fine control bits to the first set of N p-type devices;
a coarse-grain counter coupled to the second set of M p-type devices to provide coarse control bits to the second set of M p-type devices, wherein one bit of the coarse control bits is to cause a larger current change in the second set of M p-type devices than a current change caused by one bit of the fine control bits in the first set of N p-type devices; and
a logic unit to send a first signal to the first counter to generate the fine control bits and a second signal to the second counter to generate the coarse control bits.

18. The system-on-chip of claim 17, wherein N>M.

19. The system-on-chip of claim 17, wherein the current change in the second set of M p-type devices caused by one bit of the coarse control bits is at least four times greater than the current change in the first set of N p-type devices caused by one bit of the fine control bits.

20. The system-on-chip of claim 17, further comprising:
a first comparator to output a voltage indicative of a difference between a first reference voltage and a voltage of the load; and
a second comparator to output a voltage indicative of a difference between a second reference voltage and the voltage of the load, wherein the logic unit is to send the first signal in response to the voltage output from the first comparator and to send the second signal in response to the voltage output from the second comparator.

* * * * *